(12) United States Patent
Pringle, IV

(10) Patent No.: US 11,027,461 B2
(45) Date of Patent: Jun. 8, 2021

(54) APPARATUS FOR APPLYING MATERIALS OVER FASTENER HEADS PROTRUDING FROM NON-HORIZONTAL SURFACES

(71) Applicant: The Boeing Company, Chicago, IL (US)

(72) Inventor: John W. Pringle, IV, Gardena, CA (US)

(73) Assignee: The Boeing Company, Chicago, IL (US)

(*) Notice: Subject to any disclaimer, the term of this patent is extended or adjusted under 35 U.S.C. 154(b) by 0 days.

(21) Appl. No.: 16/599,808

(22) Filed: Oct. 11, 2019

(65) Prior Publication Data
US 2020/0039119 A1 Feb. 6, 2020

Related U.S. Application Data

(62) Division of application No. 15/469,784, filed on Mar. 27, 2017, now Pat. No. 10,486,343.

(51) Int. Cl.
*B29C 39/10* (2006.01)
*F16B 33/00* (2006.01)
*F16B 39/02* (2006.01)

(52) U.S. Cl.
CPC ............ *B29C 39/10* (2013.01); *F16B 33/004* (2013.01); *F16B 39/021* (2013.01)

(58) Field of Classification Search
None
See application file for complete search history.

(56) References Cited

U.S. PATENT DOCUMENTS 4,841,904 A * 6/1989 Leifsen, Jr. ............... B05B 5/08
118/122
5,322,381 A * 6/1994 Argo, II ................. B65D 47/06
222/566

(Continued)

FOREIGN PATENT DOCUMENTS

CN 106111372 A 11/2016
CN 106423702 A 2/2017

(Continued)

OTHER PUBLICATIONS

"U.S. Appl. No. 15/469,784, Restriction Requirement dated Apr. 25, 2019", 6 pgs.

(Continued)

*Primary Examiner* — Joseph S Del Sole
*Assistant Examiner* — Yung-Sheng M Tsui
(74) *Attorney, Agent, or Firm* — Kwan & Olynick LLP

(57) ABSTRACT

An applicator for applying a material over a fastener head, protruding from a non-horizontal surface of a part, comprises an enclosure and a daubing lever. The daubing lever passes through the wall of the enclosure and is movably coupled to the enclosure. The daubing lever comprises an actuation end, located on the outer side of the wall of the enclosure, a working end, located opposite the actuation end on the inner side of the wall of the enclosure, and an abutment portion, located at one of the actuation end, the working end, or between the actuation end and the working end. The applicator further comprises a biaser for imparting a moment on the daubing lever to bias the abutment portion of the daubing lever toward the enclosure.

20 Claims, 16 Drawing Sheets

(56) References Cited

U.S. PATENT DOCUMENTS

| | | | |
|---|---|---|---|
| 7,090,421 B1* | 8/2006 | Mead | B05C 17/0232 |
| | | | 15/230.11 |
| 9,061,313 B1* | 6/2015 | Williams | B05C 1/02 |
| 9,180,480 B1* | 11/2015 | Williams | C23C 22/73 |
| 10,486,343 B2 | 11/2019 | Pringle, IV | |
| 2018/0272571 A1 | 9/2018 | Pringle, IV | |

FOREIGN PATENT DOCUMENTS

| | | |
|---|---|---|
| JP | 3688190 B2 | 8/2005 |
| WO | 2014080986 A1 | 5/2014 |

OTHER PUBLICATIONS

"U.S. Appl. No. 15/469,784, Notice of Allowance dated Jul. 17, 2019", 12 pgs.

Chinese Application Serial No. 201810049262.5, Office Action dated Nov. 27, 2020.

\* cited by examiner

APPARATUS FOR APPLYING MATERIALS OVER FASTENER HEADS PROTRUDING FROM NON-HORIZONTAL SURFACES

CROSS-REFERENCE TO RELATED APPLICATION

This application is a divisional of U.S. application Ser. No. 15/469,784, entitled "METHODS OF APPLYING MATERIALS OVER FASTENER HEADS PROTRUDING FROM NON-HORIZONTAL SURFACES," filed on 27 Mar. 2017 which is incorporated herein by reference in its entirety for all purposes.

TECHNICAL FIELD

The present disclosure relates to apparatuses and methods for applying materials over fastener heads protruding from non-horizontal surfaces of parts.

BACKGROUND

When materials, such as adhesives, sealants, paints, potting materials, and the like, are applied over fastener heads protruding from non-horizontal surfaces of parts, these materials may sag due to gravity before the materials are cured. Yet, not all parts can be positioned such that their surfaces and protruding fastener heads are horizontal to avoid the effects of gravity.

SUMMARY

Accordingly, apparatuses and methods, intended to address at least the above-identified concerns, would find utility.

The following is a non-exhaustive list of examples, which may or may not be claimed, of the subject matter according to the invention.

One example of the subject matter according to the invention relates to an applicator for applying a material over a fastener head, protruding from a non-horizontal surface of a part. The applicator comprises an enclosure, a daubing lever, and means for imparting a moment on the daubing lever. The enclosure comprises a wall, comprising an inner side. The wall also comprises an interior surface on the inner side and an outer side, opposite the inner side. The enclosure further comprises an interior space, defined by the interior surface of the wall. The daubing lever passes through the wall of the enclosure and is movably coupled to the enclosure. The daubing lever comprises an actuation end, located on the outer side of the wall of the enclosure. The daubing lever also comprises a working end, located opposite the actuation end on the inner side of the wall of the enclosure. Furthermore, the daubing lever comprises an abutment portion, located at one of the actuation end, the working end, or between the actuation end and the working end. The means for imparting the moment on the daubing lever bias the abutment portion of the daubing lever toward the enclosure.

Another example of the subject matter according to the invention relates to a method of applying a material onto a fastener head, protruding from a non-horizontal surface of a part. The material is applied using an applicator comprising an enclosure, a daubing lever, extending within an interior space of the enclosure, and means for imparting a moment on the daubing lever to bias an abutment portion of the daubing lever toward the enclosure. The method comprises advancing the applicator toward the non-horizontal surface of the part along an axis that is perpendicular to the non-horizontal surface. The applicator is advanced to establish contact between a working end of the daubing lever and the fastener head and to cause the abutment portion of the daubing lever to move away from the enclosure. The method further comprises pressing a sealing rim of the enclosure against the non-horizontal surface of the part around the fastener head. The method also comprises at least partially filling the enclosure with the material. The method additionally comprises retracting the applicator away from the non-horizontal surface along the axis perpendicular to the non-horizontal surface while maintaining contact between the working end of the daubing lever and the fastener head to enable the means for imparting the moment on the daubing lever to cause the working end of the daubing lever to move relative to the enclosure across the fastener head and to asymmetrically distribute the material, at least partially filling the enclosure, across the fastener head such that more of the material is located along a top half of the fastener head then along a bottom half of the fastener head.

BRIEF DESCRIPTION OF THE DRAWINGS

Figure 1:
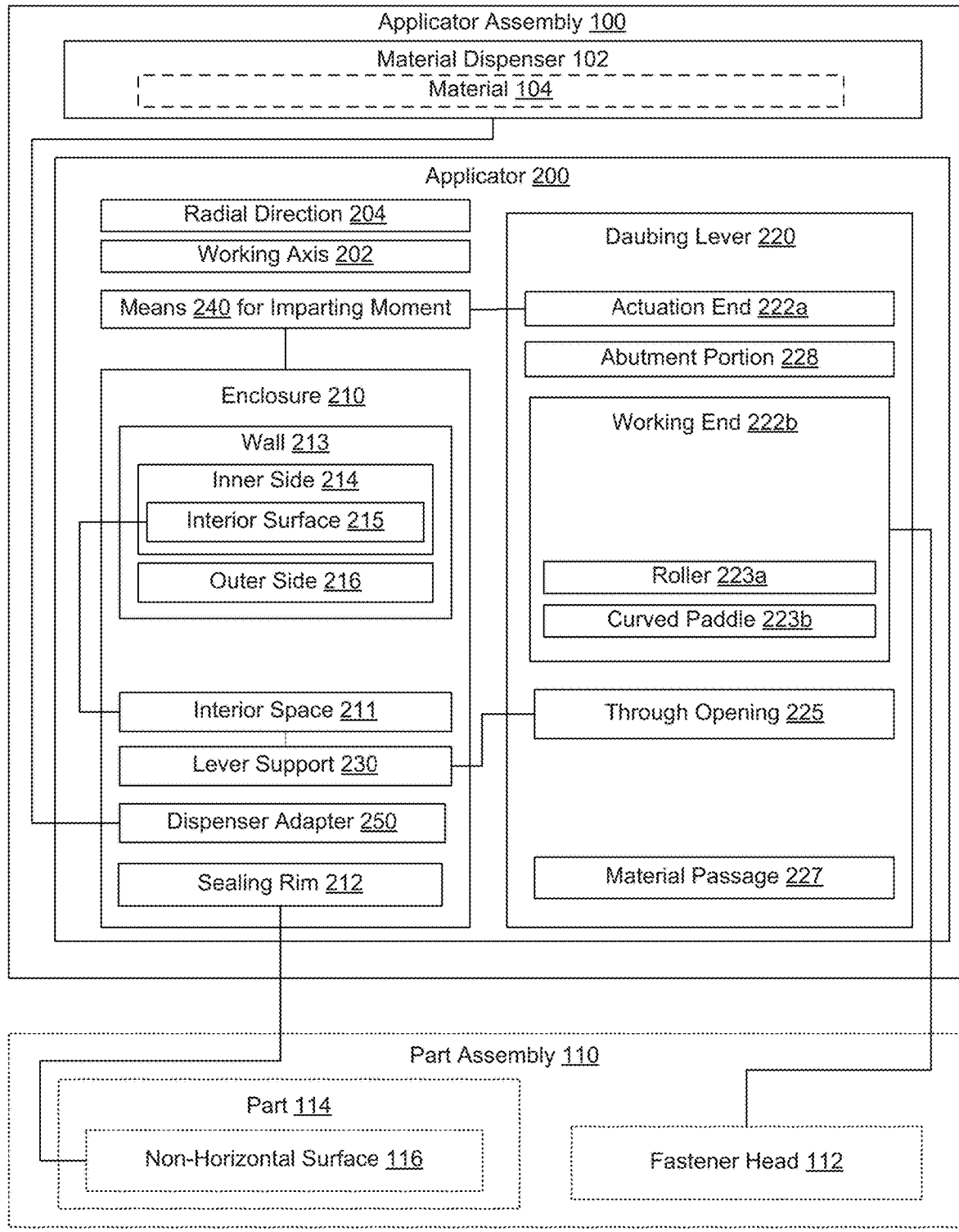
Figure 2A:
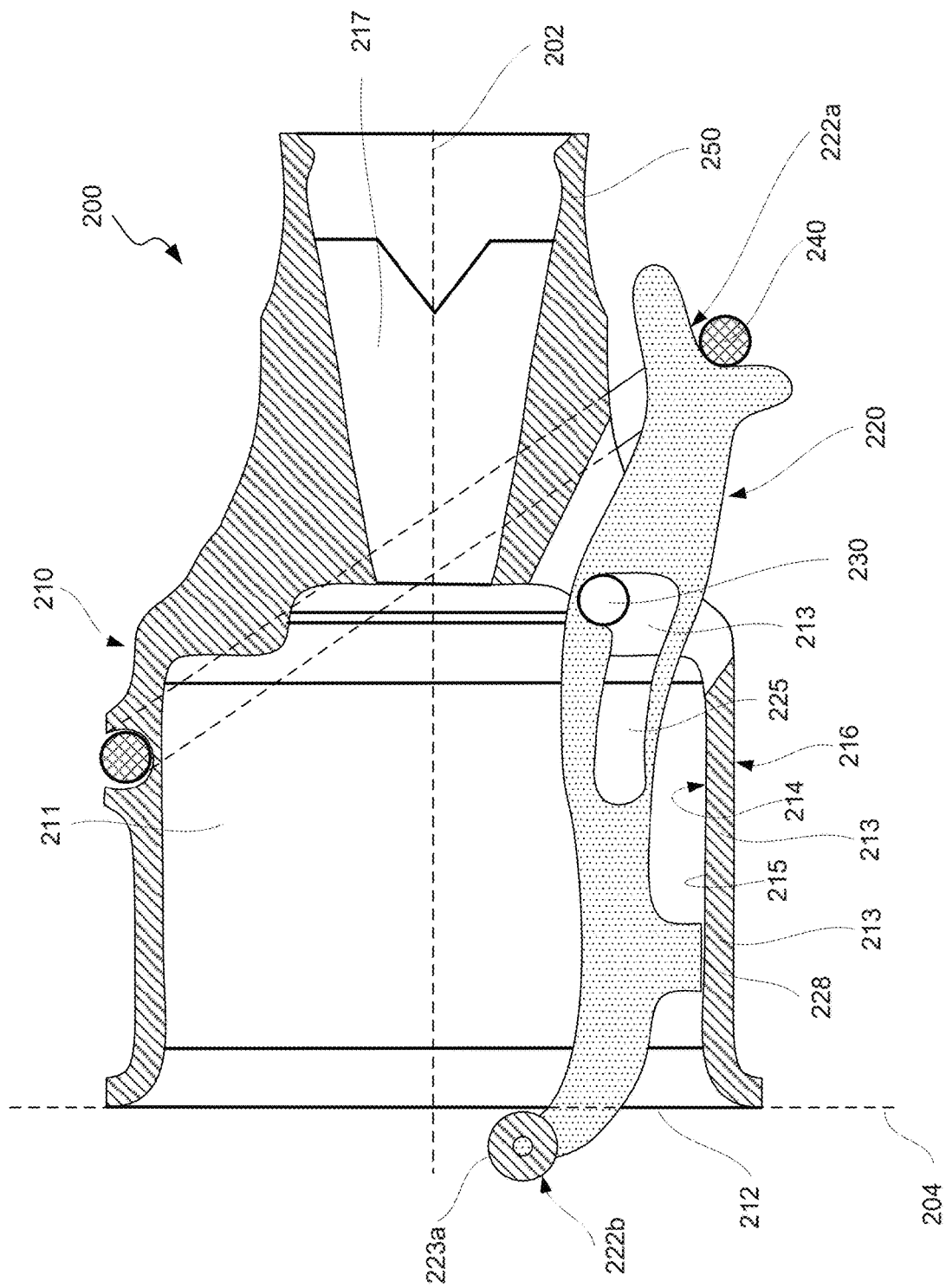
Figure 2B:
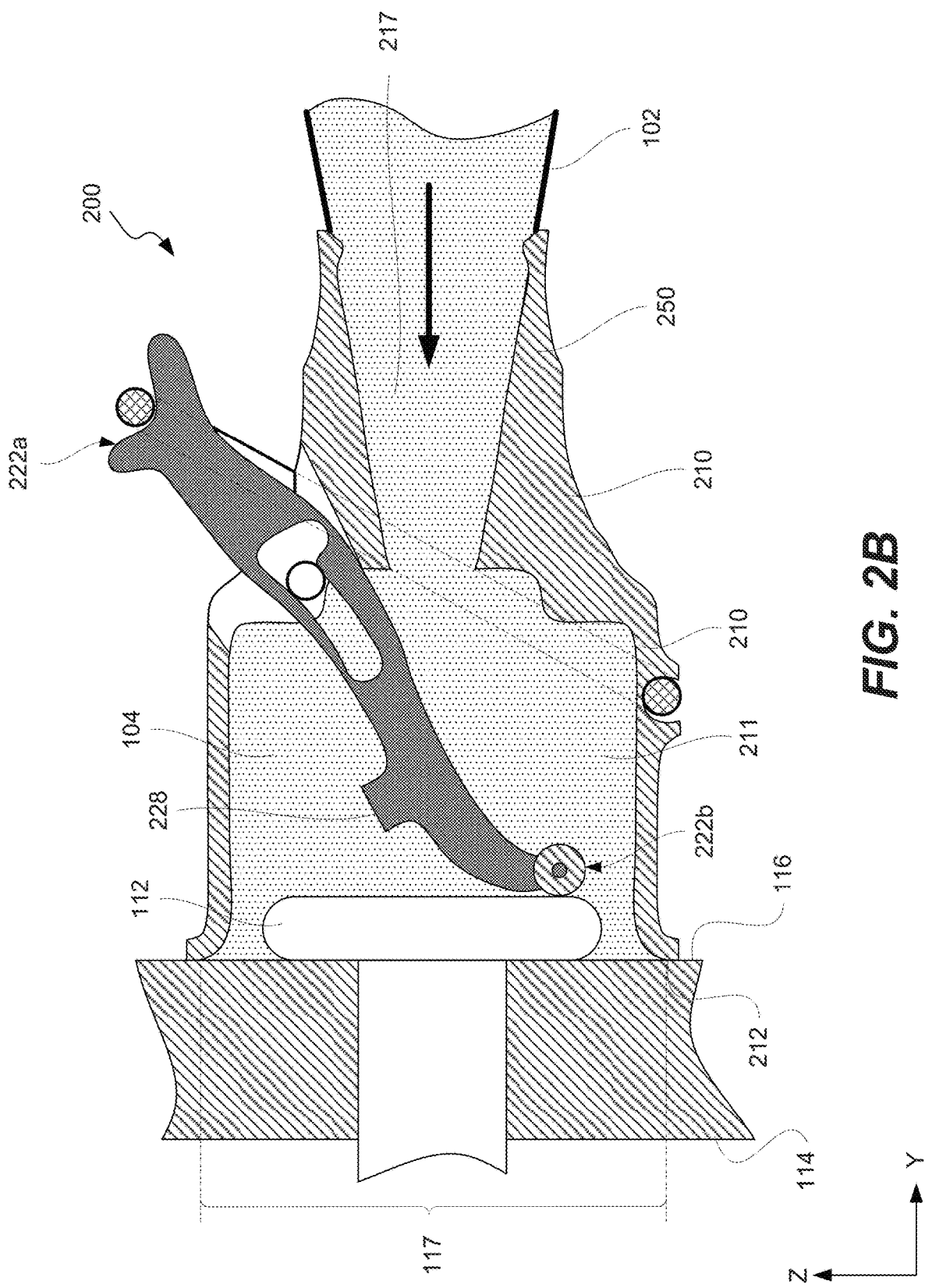
Figure 2C:
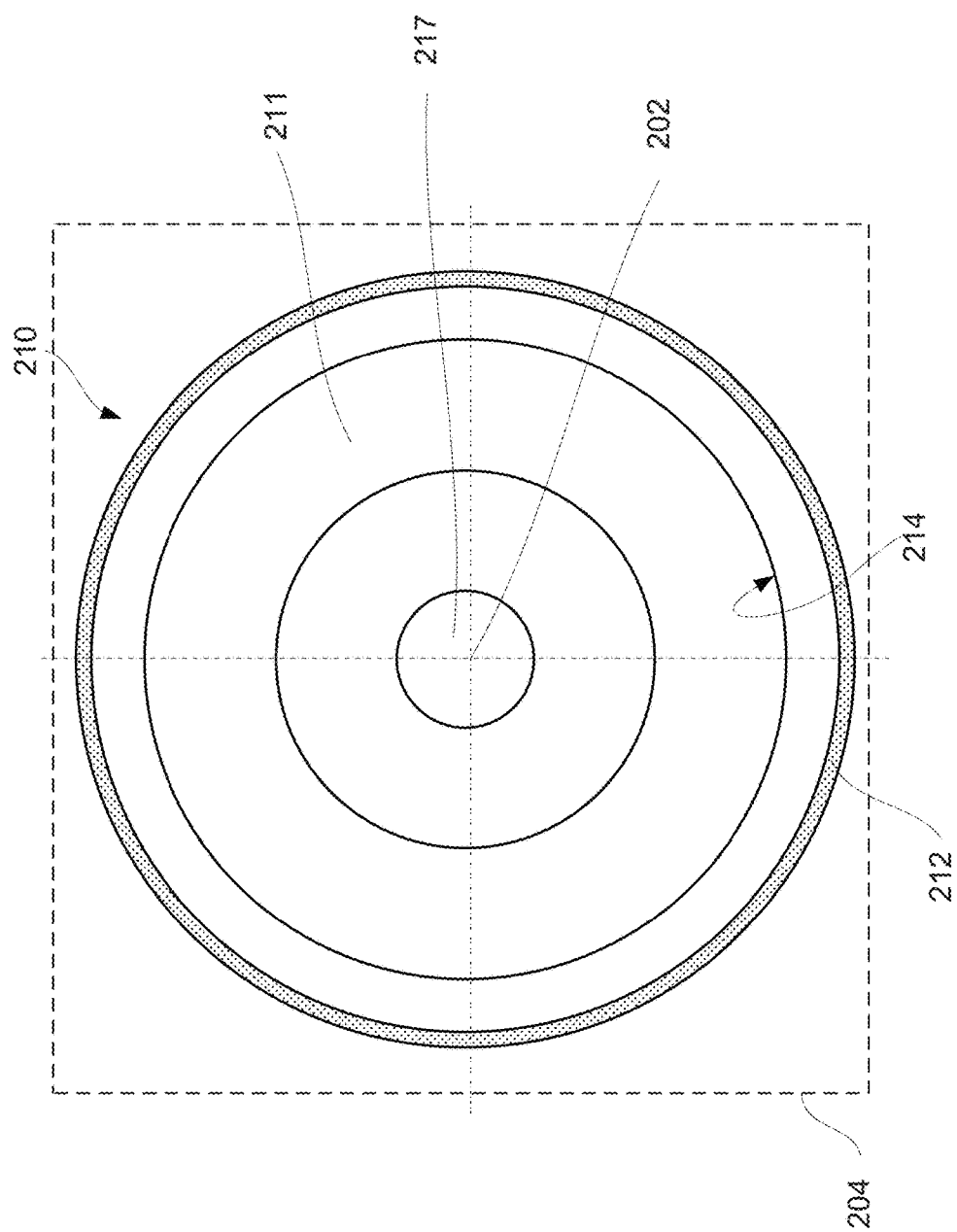
Figure 2D:
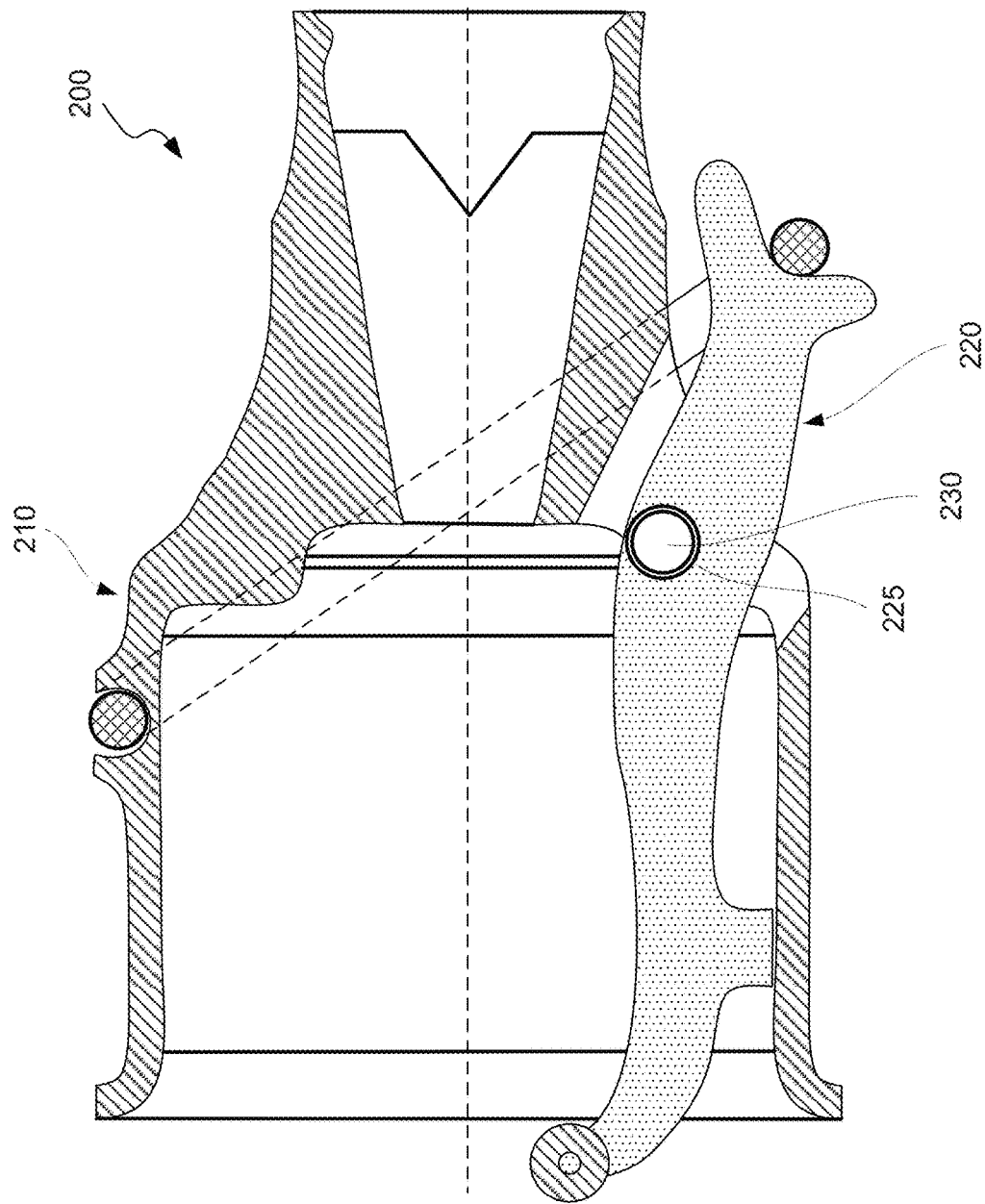
Figure 3:
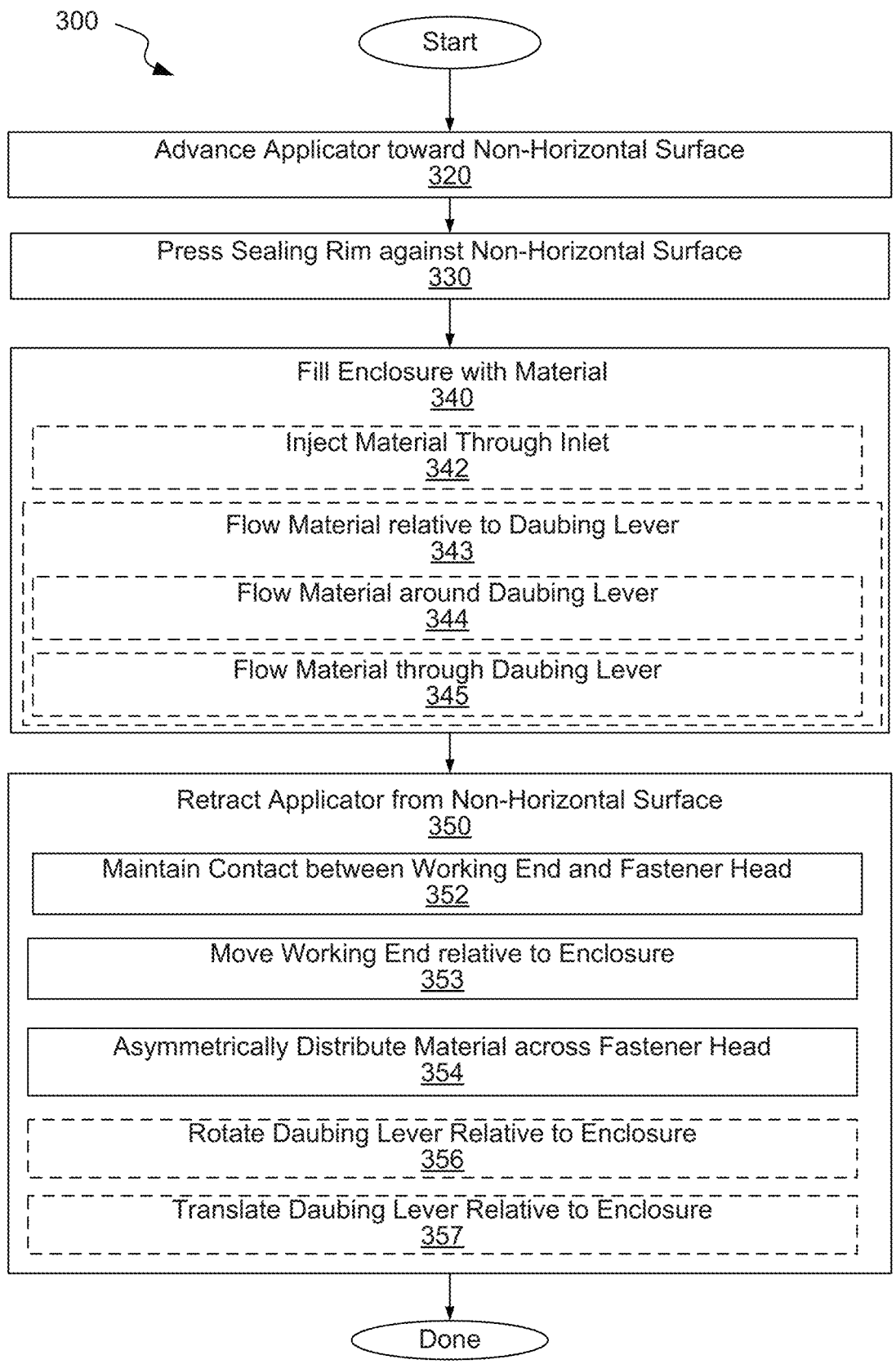
Figure 7:
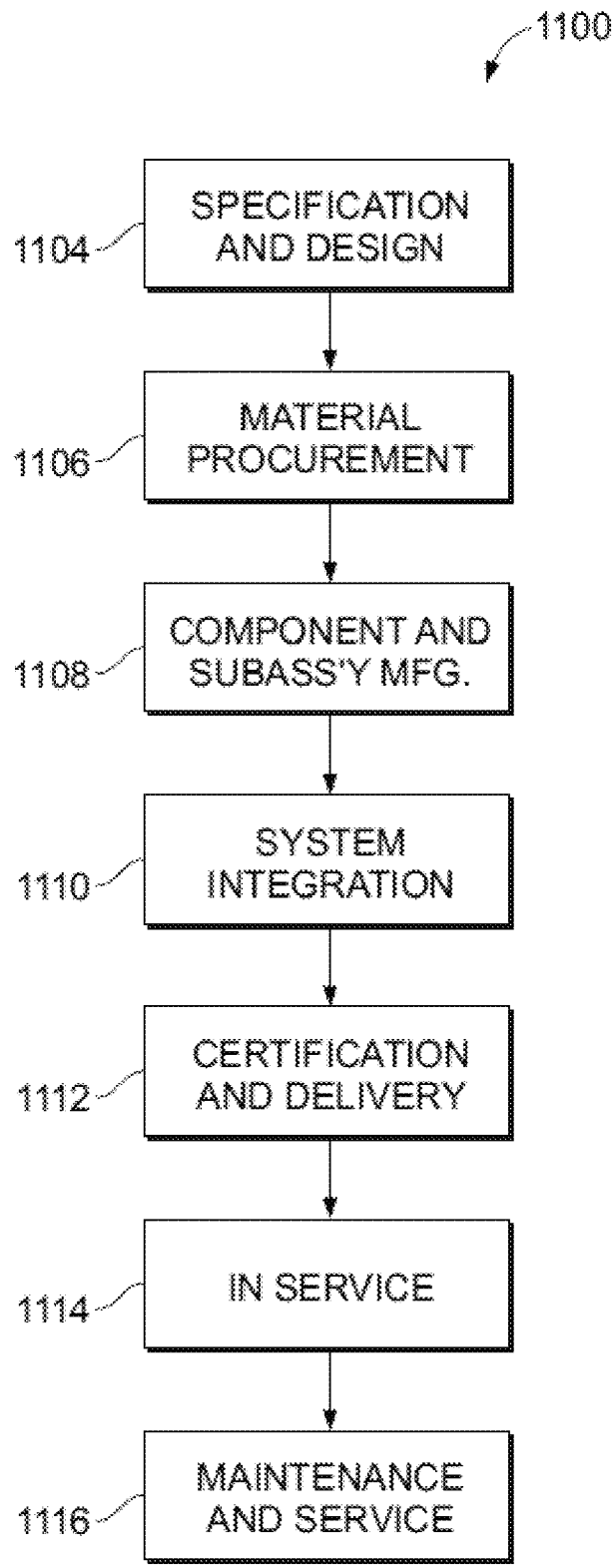

Having thus described one or more examples of the invention in general terms, reference will now be made to the accompanying drawings, which are not necessarily drawn to scale, and wherein like reference characters designate the same or similar parts throughout the several views, and wherein:

FIG. 1 is a block diagram of an applicator assembly comprising an applicator, according to one or more examples of the present disclosure;

FIG. 2A is a schematic, side, cross-sectional view of the applicator of FIG. 1, according to one or more examples of the present disclosure;

FIG. 2B is a schematic, side, cross-sectional view of the applicator of FIG. 1 showing material filling the interior space of the enclosure of the applicator, according to one or more examples of the present disclosure;

FIG. 2C is a schematic, bottom view of an enclosure of the applicator of FIG. 1, according to one or more examples of the present disclosure;

FIG. 2D is a schematic, side, cross-sectional view of the applicator of FIG. 1 showing a circular through opening, according to one or more examples of the present disclosure;

FIG. 3 is a block diagram of a method of applying material onto a fastener head utilizing the applicator of FIG. 1, according to one or more examples of the present disclosure;

FIGS. 4A-4J are schematic, side, cross-sectional views of the applicator of FIG. 1 at different stages of the method of FIG. 3, according to one or more examples of the present disclosure;

FIGS. 5A-5E are schematic, perspective, cross-sectional views of the applicator of FIG. 1, according to one or more examples of the present disclosure;

FIGS. 6A-6D are schematic, side views of the daubing lever of the applicator of FIG. 1, according to one or more examples of the present disclosure;

FIG. 7 is a block diagram of aircraft production and service methodology; and

Figure 8:
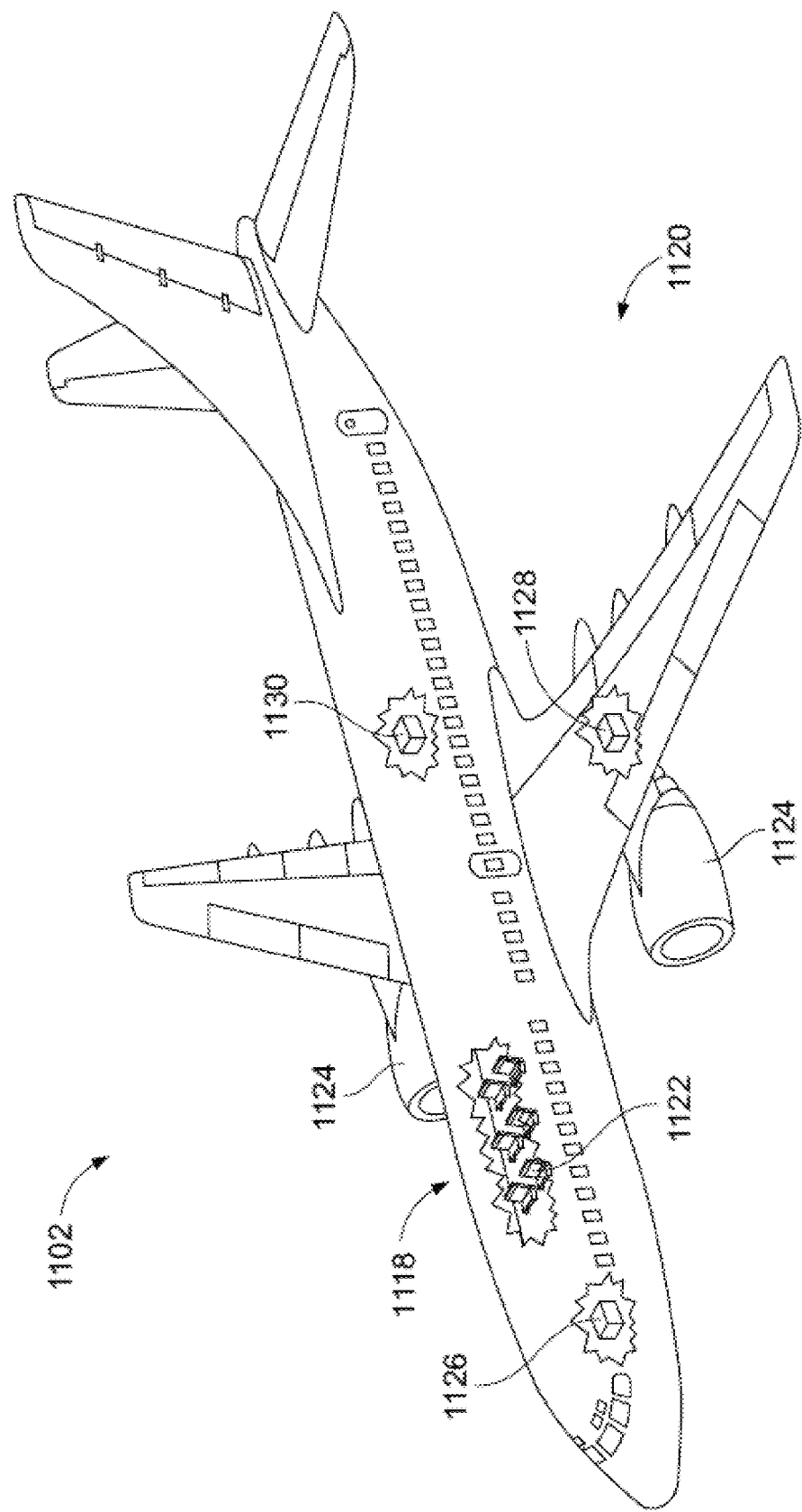

FIG. 8 is a schematic illustration of an aircraft.

DETAILED DESCRIPTION

In FIG. 1, referred to above, solid lines, if any, connecting various elements and/or components may represent mechanical, electrical, fluid, optical, electromagnetic and other couplings and/or combinations thereof. As used herein, "coupled" means associated directly as well as indirectly. For example, a member A may be directly associated with a member B, or may be indirectly associated therewith, e.g., via another member C. It will be understood that not all relationships among the various disclosed elements are necessarily represented. Accordingly, couplings other than those depicted in the block diagrams may also exist. Dashed lines, if any, connecting blocks designating the various elements and/or components represent couplings similar in function and purpose to those represented by solid lines; however, couplings represented by the dashed lines may either be selectively provided or may relate to alternative examples of the present disclosure. Likewise, elements and/or components, if any, represented with dashed lines, indicate alternative examples of the present disclosure. One or more elements shown in solid and/or dashed lines may be omitted from a particular example without departing from the scope of the present disclosure. Environmental elements, if any, are represented with dotted lines. Virtual (imaginary) elements may also be shown for clarity. Those skilled in the art will appreciate that some of the features illustrated in FIG. 1 may be combined in various ways without the need to include other features described in FIG. 1, other drawing figures, and/or the accompanying disclosure, even though such combination or combinations are not explicitly illustrated herein. Similarly, additional features not limited to the examples presented, may be combined with some or all of the features shown and described herein.

In FIGS. 7 and 8, referred to above, the blocks may represent operations and/or portions thereof and lines connecting the various blocks do not imply any particular order or dependency of the operations or portions thereof. Blocks represented by dashed lines indicate alternative operations and/or portions thereof. Dashed lines, if any, connecting the various blocks represent alternative dependencies of the operations or portions thereof. It will be understood that not all dependencies among the various disclosed operations are necessarily represented. FIGS. 7 and 8 and the accompanying disclosure describing the operations of the method(s) set forth herein should not be interpreted as necessarily determining a sequence in which the operations are to be performed. Rather, although one illustrative order is indicated, it is to be understood that the sequence of the operations may be modified when appropriate. Accordingly, certain operations may be performed in a different order or simultaneously. Additionally, those skilled in the art will appreciate that not all operations described need be performed.

In the following description, numerous specific details are set forth to provide a thorough understanding of the disclosed concepts, which may be practiced without some or all of these particulars. In other instances, details of known devices and/or processes have been omitted to avoid unnecessarily obscuring the disclosure. While some concepts will be described in conjunction with specific examples, it will be understood that these examples are not intended to be limiting.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

Reference herein to "one example" means that one or more feature, structure, or characteristic described in connection with the example is included in at least one implementation. The phrase "one example" in various places in the specification may or may not be referring to the same example.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

Illustrative, non-exhaustive examples, which may or may not be claimed, of the subject matter according the present disclosure are provided below.

Referring generally to FIG. 1 and particularly to, e.g., FIGS. 2A and 2B, applicator 200 for applying material 104 over fastener head 112, protruding from non-horizontal surface 116 of part 114, is disclosed. Applicator 200 comprises enclosure 210, daubing lever 220, and means 240 for imparting a moment on daubing lever 220. Enclosure 210 comprises wall 213, which in turn comprises inner side 214, interior surface 215 on inner side 214, and outer side 216, opposite inner side 214. Enclosure 210 further comprises interior space 211, defined by interior surface 215 of wall 213. Daubing lever 220 passes through wall 213 of enclosure 210 and is movably coupled to enclosure 210. Daubing lever 220 comprises actuation end 222a, located on outer side 216 of wall 213 of enclosure 210. Daubing lever 220 also comprises working end 222b, located opposite actuation end 222a on inner side 214 of wall 213 of enclosure 210. Daubing lever 220 further comprises abutment portion 228, located at one of actuation end 222a, working end 222b, or between actuation end 222a and working end 222b. Means 240 impart the moment on daubing lever 220 to bias abutment portion 228 of daubing lever 220 toward enclosure 210. The preceding subject matter of this paragraph characterizes example 1 of the present disclosure.

Working end 222b is configured to contact fastener head 112 as enclosure 210 is moved toward or away from non-horizontal surface 116 of part 114. This contact is ensured by the moment imparted on daubing lever 220 by means 240. This moment moves daubing lever 220 relative to enclosure 210 and maintains the contact between working end 222b and fastener head 112 as enclosure 210 is moved relative to non-horizontal surface 116. It should be noted that working end 222b moves relative to fastener head 112 while maintaining the contact. When enclosure 210 is retracted from non-horizontal surface 116 and after material 104 is applied to fastener head 112, working end 222b redistributes material 104 on fastener head 112. Specifically, material 104 may be swiped in the direction opposite of the gravitation force resulting in uneven distribution of material 104 on fastener head 112 when working end 222b eventually retracts from fastener head 112. This uneven distribution is designed to compensate for gravitational sagging that occurs later and while material 104 cures on fastener head 112. When material 104 is cured and material 104 does not sag anymore, the distribution of material 104 on fastener head 112 can be uniform.

Means 240 impart the moment on daubing lever 220 and may cause daubing lever 220 to move relative to enclosure until abutment portion 228 contacts enclosure 210 (as, e.g., shown in FIG. 2A) or working end 222b contacts fastener head 112 (as, e.g., shown in FIG. 2B). The moment is sufficient to move daubing lever 220 through material 104 in the enclosure. Various features of daubing lever 220, further described below, may assist with this movement through material 104. Material 104 may be a viscous substance (e.g., a viscosity of at least about 1,000 cP or even at least about 10,000 cP).

Furthermore, means 240 may be designed to provide enough moment for this motion to occur. Some example of means 240 for imparting a moment on daubing lever 220 are a rubber band, a spring, and a pneumatic device. For example, a rubber band may be placed around enclosure 210 and around actuation end 222a of daubing lever 220, as for example, shown in FIGS. 2A and 2B. The rubber band may pull actuation end 222a toward enclosure 210, which imparts the moment on daubing lever 220 to bias abutment portion 228 of daubing lever 220 toward enclosure 210.

Abutment portion 228 may be pulled away from enclosure 210 when working end 222b contacts fastener head 112 and counters the moment imparted by means 240. In this situation, while the moment continues to bias abutment portion 228 toward enclosure 210, it also biases working end 222b toward fastener head 112 such that working end 222b maintains contact with fastener head 112 until abutment portion 228 contacts enclosure 210. Furthermore, working end 222b continues to maintain the contact with fastener head 112 as enclosure 210 is being moved toward (see, e.g., FIGS. 4B-4D) and away (see, e.g., FIGS. 4E-4G) from non-horizontal surface 116 of part 114. This continuous contact between working end 222b and fastener head 112 causes redistribution of material 104 on fastener head 112, after material 104 is deposited into fastener head 112, and as enclosure 210 is being moved away from non-horizontal surface 116 of part 114. Specifically, this redistribution may be in the direction opposite of the gravitation force thereby allowing to compensate for gravitational sagging while material 104 cures.

Referring generally to FIG. 1 and particularly to, e.g., FIGS. 2A-2C, enclosure 210 comprises sealing rim 212 that lies in virtual plane 204. The preceding subject matter of this paragraph characterizes example 2 of the present disclosure, wherein example 2 also includes the subject matter according to example 1, above.

Sealing rim 212 is used to seal enclosure 210 relative to non-horizontal surface 116 of part 114 thereby restricting material 104 to sealed portion 117 of non-horizontal surface 116 and preventing undesired contamination of part 114 beyond sealed portion 117 as, for example, schematically shown in FIG. 2B.

When sealing rim 212 contacts non-horizontal surface 116 of part 114, material 104 flows within interior space 211 of enclosure 210 toward non-horizontal surface 116 of part 114 and fastener head 112. This flows deposits material 104 into fastener head 112 and a portion of non-horizontal surface 116 around fastener head 112. Sealing rim 212 blocks the flow of material 104 beyond sealed portion 117. As such, sealing rim 212 defines the shape and size of sealed portion 117. The flow of material 104 within interior space 211 of enclosure 210 is stopped before sealing rim 212 is moved away from non-horizontal surface 116 of part 114. Sealing rim 212 lies in virtual plane 204, which may be perpendicular to center axis 202 of applicator 200.

Referring generally to FIG. 1 and particularly to, e.g., FIG. 2C, sealing rim 212 of enclosure 210 has a circular shape. The preceding subject matter of this paragraph characterizes example 3 of the present disclosure, wherein example 3 also includes the subject matter according to example 2, above.

Sealing rim 212 may be circular to accommodate fastener head 112 that is also circular. Sealing rim 212 defines sealed portion 117, which is a boundary of material 104 on non-horizontal surface 116. The circular boundary of material 104 does not have corners and has the minimal perimeter for a given boundary area, which may be useful for some applications.

The shape of sealing rim 212 defines shape of sealed portion 117 on non-horizontal surface 116, which, in turn, may depend on the shape of fastener head 112. In some examples, the shape of sealed portion 117 corresponds to the shape of fastener head 112 with sealed portion 117 being larger than the interface of fastener head 112 with non-horizontal surface 116. This size difference defines the size of a sealing bead formed at the interface between fastener head 112 and non-horizontal surface 116. The shape of sealing rim 212 as well as the alignment between sealing rim 212 and fastener head 112 during operation of applicator 200 ensures that the size of this sealing bead is uniform and proper sealing is achieved.

Referring generally to FIG. 1 and particularly to, e.g., FIGS. 2A and 2B, daubing lever 220 is rotatable relative to enclosure 210. The preceding subject matter of this paragraph characterizes example 4 of the present disclosure, wherein example 4 also includes the subject matter according to any one of examples 1 to 3, above.

Daubing lever 220 may rotate relative to enclosure 210 to allow movement of working end 222b relative to enclosure 210 and, more specifically, to maintain the contact with fastener head 112 while enclosure 210 moves away from non-horizontal surface 116 of part 114. This contact with fastener head 112 allows working end 222b to redistribute material 104 previously applied to fastener head 112.

The rotation of daubing lever 220 relative to enclosure 210 may be a result of the moment imparted by means 240. The rotation may continue while enclosure 210 moves relative to non-horizontal surface 116 of part 114 and until abutment portion 228 of daubing lever 220 reaches enclosure 210. The rotation may be in both direction: in one direction while enclosure 210 moves toward non-horizontal surface 116 of part 114 and in the other direction while enclosure 210 moves away non-horizontal surface 116. When enclosure 210 is sealed against non-horizontal surface 116 of part 114 and does not move, working end 222b contacts fastener head 112 and daubing lever 220 does not rotate relative to enclosure 210.

Referring generally to FIG. 1 and particularly to, e.g., FIGS. 2A, 2B, and 2C and 6A-6D, daubing lever 220 comprises through opening 225. Applicator further comprises shank 230, fixed to enclosure 210 and protruding through opening 225 of daubing lever 220. The preceding subject matter of this paragraph characterizes example 5 of the present disclosure, wherein example 5 also includes the subject matter according to example 4, above.

A combination of through opening 225 and shank 230 allows daubing lever 220 at least to rotate relative to enclosure 210 and, in some examples, to translate relative to enclosure 210 or, more specifically, relatively to shank 230. Shank 230 is effectively a pivot point for rotation of daubing lever 220 relative to enclosure 210. Shank 230 is also a retention for daubing lever 220 that restricts other types of movement of daubing lever 220.

Shank 230 may have a cylindrical shape. Shank 230 may protrude between two edges of enclosure 210. These edges may support shank 230. Shank 230 may also support daubing lever 220. A combination of through opening 225 and shank 230 controls the motion of daubing lever 220 relative to daubing lever 220. For example, if both through opening 225 and shank 230 are circular (as, e.g., shown in FIG. 2D), then daubing lever 220 can only rotate relative to enclosure 210 around the center axis of through opening 225 and shank 230. However, if through opening 225 is a slot, then daubing lever 220 can also translate relative to enclosure 210.

Figure 6A:
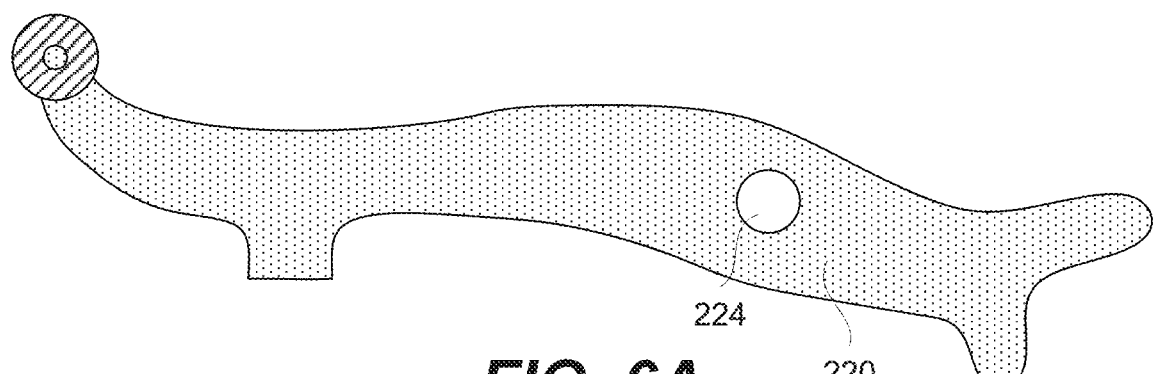

Referring generally to FIG. 1 and particularly to, e.g., FIGS. 2D and 6A, through opening 225 of daubing lever 220 is circular. The preceding subject matter of this paragraph characterizes example 6 of the present disclosure, wherein example 6 also includes the subject matter according to example 5, above.

Through opening 225 may be circular, which allows daubing lever 220 to rotate relative to enclosure 210. Furthermore, when through opening 225 is circular, daubing lever 220 cannot translate relative to enclosure 210.

Restricting movement of daubing lever 220 relative to enclosure 210 may simplify operations of applicator 200. Furthermore, this feature may be used for fastener head 112 with a planar top surface. The length of a portion of daubing lever 220 extending between working end 222b and through opening 225 may be selected, at least in part, based on the diameter of fastener head 112. Another factor in selecting the length of this portion may be the thickness of fastener head 112.

Referring generally to FIG. 1 and particularly to, e.g., FIGS. 2A, 2B, 6C, and 6D through opening 225 of daubing lever 220 is a curved slot. The preceding subject matter of this paragraph characterizes example 7 of the present disclosure, wherein example 7 also includes the subject matter according to example 5, above.

When through opening 225 is a slot, daubing lever 220 may rotate and translate relative to enclosure 210. While daubing lever 220 may rotate relative to enclosure 210 at any time, the curvature of through opening 225 may control at which point (e.g., an angle of daubing lever 220 relative to enclosure 210), daubing lever 220 may start translating relative to enclosure 210. This translating feature may be used to accommodate fastener head 112 having a complex shape (e.g., a semi-spherical shape).

The curvature of through opening 225 may be specifically designed to accommodate particular shapes of fastener head 112. For example, a semi-circular shape of fastener head 112 may need for daubing lever 220 to both translate and rotate relative to enclosure 210. The combination of these features and the timing (provided by the curvature) ensures that working end 222b of daubing lever 220 stays in contact with fastener head 112 as working end 222b radially moves across fastener head 112 while swiping material 104 deposited on fastener head 112.

Figure 6B:
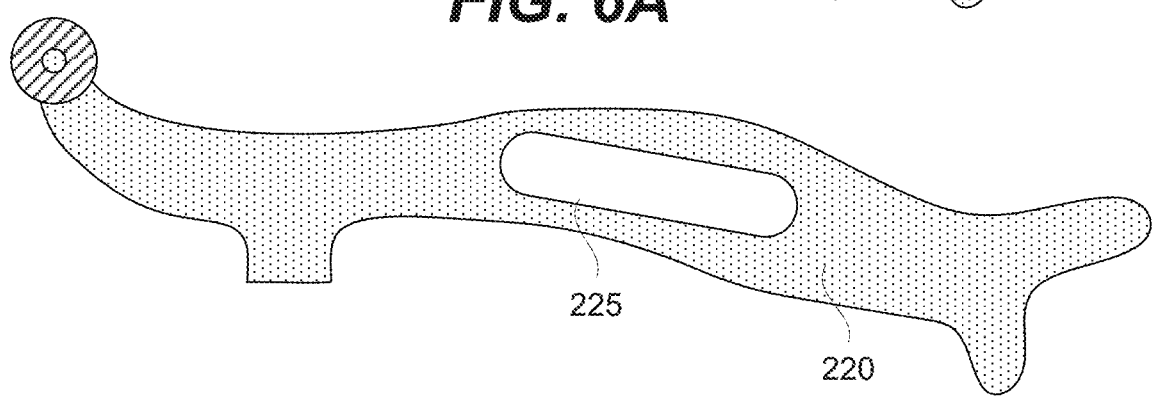
Figure 6C:
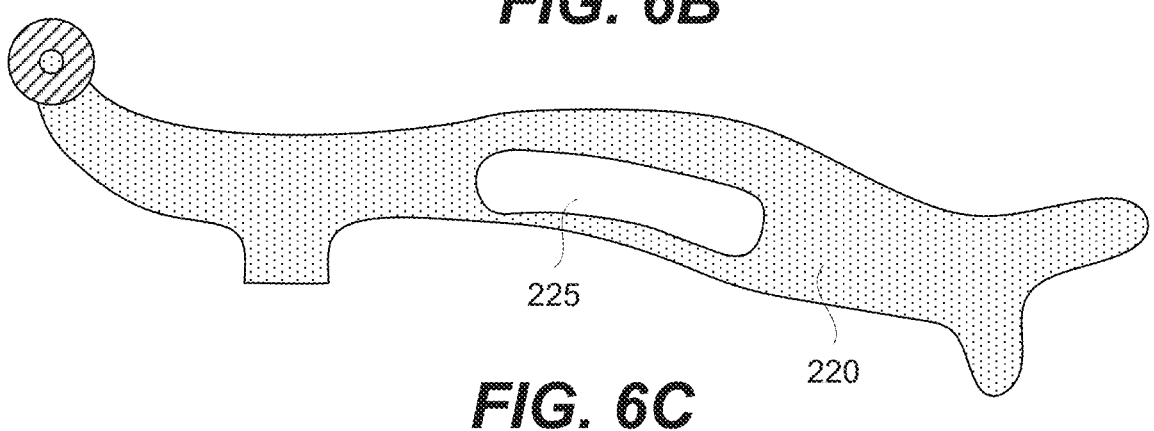

Referring generally to FIG. 1 and particularly to, e.g., FIG. 6B, through opening 225 of daubing lever 220 is straight slot. The preceding subject matter of this paragraph characterizes example 8 of the present disclosure, wherein example 8 also includes the subject matter according to example 5, above.

When through opening 225 is a straight slot, daubing lever 220 may be also able to translate relative to enclosure 210 in addition to being able to rotate relative to enclosure 210. With through opening 225 being a straight slot, daubing lever 220 may translate relative to enclosure 210 at any time. Likewise, daubing lever 220 may rotate relative to enclosure 210 at any time.

With through opening 225 being a straight slot, daubing lever 220 may have more movement flexibility since daubing lever 220 can rotate and translate relative to enclosure 210 at any time than, for example, other examples described above. With this additional flexibility, working end 222b of daubing lever 220 may accommodate additional shapes of fastener head 112 that may not have been possible with other designs. Furthermore, applicator 200 can be made more compact because daubing lever 220 can be shortened as a result of this additional flexibility.

Figure 6D:
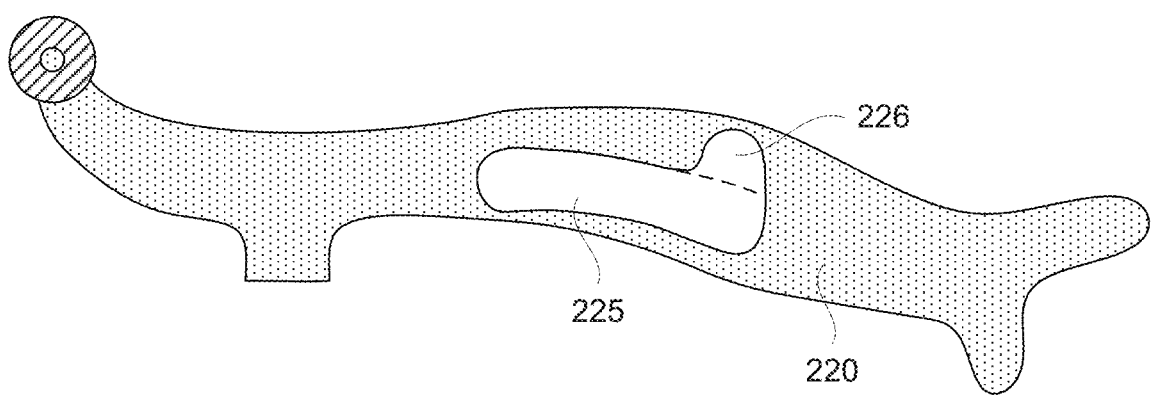

Referring generally to FIG. 1 and particularly to, e.g., FIGS. 2A, 2B, and 6D, through opening 225 of daubing lever 220 has dogleg shape. The preceding subject matter of this paragraph characterizes example 9 of the present disclosure, wherein example 9 also includes the subject matter according to example 5, above.

A dogleg shape of through opening 225 is a specific example of a curved shape, which has an abrupt angle, which may be associated with catch 226. The dogleg shape allows to delay the translational motion of daubing lever 220 relative to enclosure 210 until a certain angle of daubing lever 220 relative to enclosure 210 or, more specifically, of the dogleg profile of through opening 225 relative to the moment imparted by means 240 is reached. Once the threshold angle, defined by the dogleg shape, is reached, daubing lever 220 can start translating relative to enclosure 210.

The dogleg shape and the translating delay associated with the dogleg shape may be used to accommodate fastener head 112 having particular shapes (e.g., a semi-spherical shape).

Figure 5A:
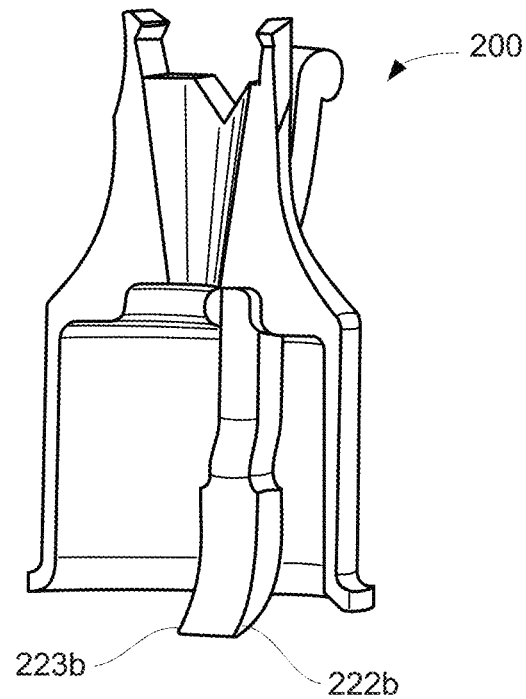
Figure 5B:
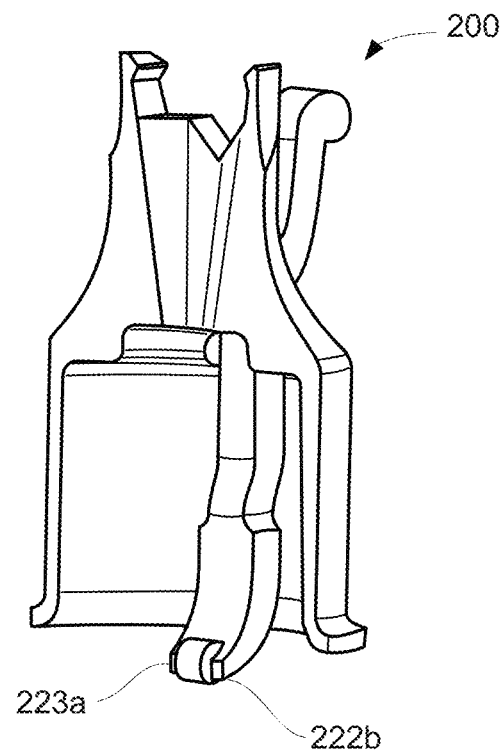
Figure 5C:
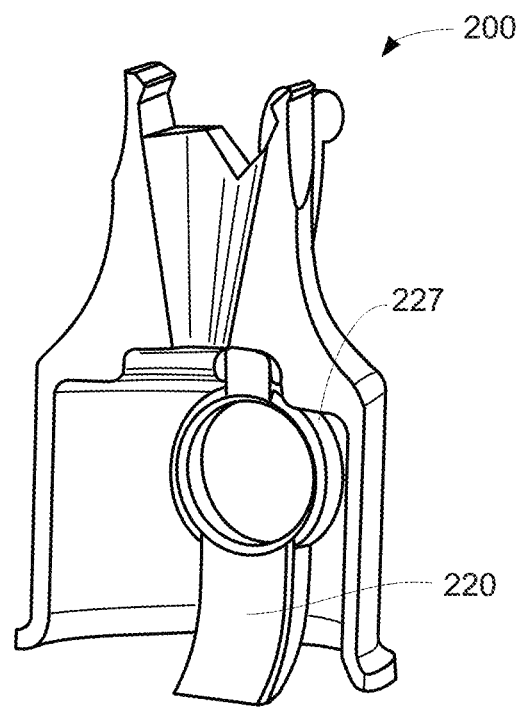

Referring generally to FIG. 1 and particularly to, e.g., FIG. 5C, daubing lever 220 further comprises material passage 227, located between actuation end 222a and working end 222b of daubing lever 220. The preceding subject matter of this paragraph characterizes example 10 of the present disclosure, wherein example 10 also includes the subject matter according to any one of examples 5 to 9, above.

Material passage 227 allows material to flow through daubing lever 220 rather than around daubing lever 220. This feature allows daubing lever 220 to more easily move within enclosure 210 when enclosure 210 is filled with material 104 and also to use wider stems for daubing lever 220.

Material passage 227 may be a ring as, for example, shown in FIG. 5C or any other similar feature. Material passage 227 is designed such that actuation end 222a and working end 222b are supported with respect to each other and allow to transfer the moment through daubing lever 220. The size and shape of material passage 227 may depend on viscosity of material, size of daubing lever 220, size of enclosure 210, and speed with which daubing lever 220 needs to travel through material 104.

Referring generally to FIG. 1 and particularly to, e.g., FIG. 5C, a line, perpendicular to a plane, containing the smallest circumferentially closed section of through opening 225, lies in a first plane. A line, perpendicular to a plane, containing the smallest circumferentially closed section of material passage 227, lies in a second plane. The first plane is perpendicular to the second plane. The preceding subject matter of this paragraph characterizes example 11 of the present disclosure, wherein example 11 also includes the subject matter according to example 10, above.

The orientation of material passage 227 may be substantially perpendicular to the direction of the motion of daubing lever 220 within enclosure 210. This orientation ensures that material 104 more easily flow through material passage 227 than encountering various solid components of daubing lever 220.

The first plane containing the smallest circumferentially closed section of through opening 225 is effectively the plane in which daubing lever 220 moves when it rotates and/or translates relative to enclosure 210. As such, when daubing lever 220 moves through material 104, the resisting forces will be within this plane or parallel to this plane. As such, material passage 227 or, more specifically, the second plane, containing the smallest circumferentially closed section of material passage 227, may be perpendicular to the first plane to reduce the resistance.

Referring generally to FIG. 1 and particularly to, e.g., FIGS. 2A and 2B, daubing lever 220 is translatable relative to enclosure 210. The preceding subject matter of this paragraph characterizes example 12 of the present disclosure, wherein example 12 also includes the subject matter according to any one of examples 4, 5, and 7 to 11, above.

Daubing lever 220 may translate relative to enclosure 210 to accommodate various shapes of fastener head 112 and to ensure that working end 222b of daubing lever 220 remain in contact with fastener head 112 when enclosure is moved away from non-horizontal plane 116 of part 114.

The translation may be provided by a slot in daubing lever 220 as described above. The translation direction may be defined by the shape of the slot. In some examples, daubing lever 220 may both translate and rotate relative to enclosure 210.

Figure 5D:
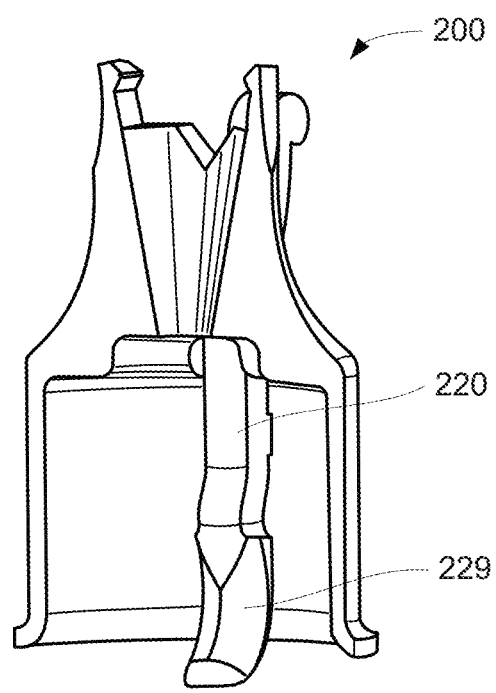
Figure 5E:
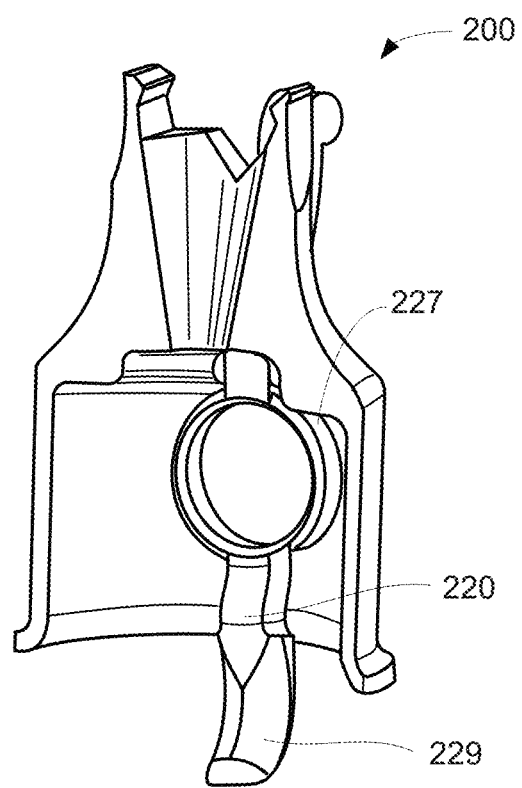

Referring generally to FIG. 1 and particularly to, e.g., FIG. 5D, daubing lever 220 further comprises tapered portion 229 between actuation end 222a and working end 222b of daubing lever 220. The preceding subject matter of this paragraph characterizes example 13 of the present disclosure, wherein example 13 also includes the subject matter according to any one of examples 1 to 12, above.

Tapered portion 229 allows for material 104 to flow easily around daubing lever 220 when daubing lever 220 moves through material 104 (e.g., translates and/or rotates relative to enclosure 210). Specifically, tapered portion 229 reduces the drag experienced by daubing lever 220.

Tapered portion 229 may include a fillet, chamfer, or any other suitable feature. Tapered portion 229 may be provided on one side of daubing lever 220 or both sides of daubing lever 220.

Referring generally to FIG. 1 and particularly to, e.g., FIG. 2D, a line, perpendicular to a plane, containing the smallest circumferentially closed section of through opening 225, lies in a first plane. A symmetry plane of tapered portion 229 is perpendicular to the first plane. The preceding subject matter of this paragraph characterizes example 14 of the present disclosure, wherein example 14 also includes the subject matter according to example 13, above.

The orientation of tapered portion 229 may be substantially perpendicular to the direction of the motion of daubing lever 220 within enclosure 210. This orientation ensures that material 104 more easily flow around daubing lever 220.

The first plane containing the smallest circumferentially closed section of through opening 225 is effectively the plane in which daubing lever 220 moves when it rotates and/or translates relative to enclosure 210. As such, when daubing lever 220 moves through material 104, the resisting forces will be within this plane or parallel to this plane. As such, the orientation of tapered portion 229 or, more specifically, the symmetry plane of tapered portion 229 may be perpendicular to the first plane to reduce the resistance.

Referring generally to FIG. 1 and particularly to, e.g., FIG. 2A, daubing lever 220 is movable relative to enclosure 210 such that abutment portion 228 of daubing lever 220 is capable of contacting interior surface 215 of enclosure 210. The preceding subject matter of this paragraph characterizes example 15 of the present disclosure, wherein example 15 also includes the subject matter according to any one of examples 1 to 14, above.

Abutment portion 228 of daubing lever 220 acts as one of positive stops for the movement of daubing lever 220. Once abutment portion 228 contacts interior surface 215 of enclosure 210, daubing lever 220 cannot further move in this direction using the moment imparted by means 240.

Daubing lever 220 is movable by the moment imparted by means 240 or forces applied to working end 222b. When working end 222b initially contacts fastener head 112 (as, e.g., shown in 4B), abutment portion 228 contacts interior surface 215 of enclosure 210. As enclosure 210 moves closer to non-horizontal surface 116, daubing lever 220 moves relative to enclosure 210 and abutment portion 228 loosed contact interior surface 215 (as, e.g., shown in 4C). The contact is not established until working end 222b is being removed from fastener head 112 (as, e.g., shown in 4G and 4H). In other words, unless working end 222b contacts fastener head 112, abutment portion 228 of daubing lever 220 acts as a positive stop for the movement of daubing lever 220.

Abutment portion 228 may be a protrusion between actuation end 222a and working end 222b as, for example, schematically shown in FIG. 2A. In other examples, abutment portion 228 may be positioned on actuation end 222a or working end 222b. Furthermore, abutment portion 228 may be incorporated into means 240.

Referring generally to FIG. 1 and particularly to, e.g., FIGS. 5A and 5B, working end 222b of daubing lever 220 comprises one of roller 223a or curved paddle 223b, The preceding subject matter of this paragraph characterizes example 16 of the present disclosure, wherein example 16 also includes the subject matter according to any one of examples 1 to 15, above.

Roller 223a or curved paddle 223b configuration of working end 222b allows working end 222b to translate relative to fastener head 112 (at least in a radial direction) without generating significant friction forces or catch on various protrusions on the surface of fastener head 112.

FIG. 5A illustrates working end 222b of daubing lever 220 comprising curved paddle 223b. Curved paddle 223b can be easily cleaned after material 104 is removed from enclosure 210. FIG. 5B illustrates working end 222b of daubing lever 220 comprising roller 223a. Roller 223a can have a cylindrical shape. It should be noted that both roller 223a and curved paddle 223b are also capable of redistributing material 104 on fastener head 112.

Referring generally to FIG. 1 and particularly to, e.g., FIG. 2A, working end 222b of daubing lever 220 is operable to extend outside of interior space 211 of enclosure 210. The preceding subject matter of this paragraph characterizes example 17 of the present disclosure, wherein example 17 also includes the subject matter according to any one of examples 1 to 16, above.

Working end 222b of daubing lever 220 may extend outside of interior space 211 to accommodate fastener head 112 that may have a small thickness, but a large diameter.

For example, when daubing lever 220 is rotatable relative to enclosure 210, any radial travel of working end 222b would have a corresponding axial travel. As such, when a large radial travel is needed, working end 222b may extend outside of interior space 211 of enclosure 210 such that a sufficient radial travel occurs before enclosure 210 seals against non-horizontal surface 116.

Referring generally to FIG. 1 and particularly to, e.g., FIG. 3, method 300 of applying material 104 onto fastener head 112, protruding from non-horizontal surface 116 of part 114, is disclosed. The material 104 is applied using applicator 200, comprising enclosure 210, daubing lever 220, extending within interior space 211 of enclosure 210, and means 240 for imparting moment on daubing lever 220 to bias abutment portion 228 of daubing lever 220 toward enclosure 210. Method 300 comprises advancing applicator 200 toward non-horizontal surface 116 of part 114 along an axis that is perpendicular to non-horizontal surface 116 to establish contact between working end 222b of daubing lever 220 and fastener head 112 and to cause abutment portion 228 of daubing lever 220 to move away from enclosure 210 (block 320 in FIG. 3). Method 300 also comprises pressing sealing rim 212 of enclosure 210 against non-horizontal surface 116 of part 114 around fastener head 112 (block 330 in FIG. 3). Method 300 additionally comprises at least partially filling enclosure 210 with material 104 (block 340 in FIG. 3). Method 300 further comprises retracting applicator 200 away from non-horizontal surface 116 along axis perpendicular to non-horizontal surface 116 (block 350 in FIG. 3) while maintaining contact between working end 222b of daubing lever 220 and fastener head 112 (block 352 in FIG. 3) to enable means 240 for imparting moment on daubing lever 220 to cause working end 222b of daubing lever 220 to move relative to enclosure 210 (block 353 in FIG. 3) across fastener head 112 and to asymmetrically distribute material 104, at least partially filling enclosure 210, across fastener head 112 (block 354 in FIG. 3) such that more of material 104 is located along top half of fastener head 112 then along bottom half of fastener head 112. The preceding subject matter of this paragraph characterizes example 18 of the present disclosure.

Method 300 yields asymmetrical distribution of material 104 on fastener head 112, which may be used, for example, to compensate for gravitational sagging of material 104 when material 104 cures. This asymmetrical distribution is achieved when working end 222b moves across fastener head 112 at least in the radial direction. Specifically, retracting applicator 200 away from non-horizontal surface 116 along axis 202 perpendicular to non-horizontal surface causes working end 222b of daubing lever 220 to move relative to enclosure 210 across fastener head 112 and to asymmetrically distribute material 104.

When working end 222b of daubing lever 220 initially contacts fastener head 112, working end 222b slides in a first radial direction across fastener head 112 and also causes abutment portion 228 of daubing lever 220 to move away from enclosure 210. This sliding occurs while applicator 200 is being advanced toward non-horizontal surface 116 of part 114 and until sealing rim 212 of enclosure 210 is pressed against non-horizontal surface 116 of part 114 around fastener head 112. Once enclosure 210 at least partially-filled with material 104 such that material 104 contacts fastener head 112 and, in some examples, a portion of non-horizontal surface 116 within enclosure 210, applicator 200 is retracted away from non-horizontal surface 116 along axis 202. The contact between working end 222b of daubing lever 220 and fastener head 112 is maintained. Furthermore, working end 222b of daubing lever 220 moves relative to enclosure 210 across fastener head 112 and asymmetrically distributes material 104 across fastener head 112. At the end of this distribution, more of material 104 is located along top half of fastener head 112 then along bottom half of fastener head 112.

Referring generally to FIG. 1 and particularly to, e.g., FIGS. 3, 2A, and 2B, according to method 300, as applicator 200 is retracted away from non-horizontal surface 116 along axis 202 perpendicular to non-horizontal surface 116 while maintaining contact between working end 222b of daubing lever 220 and fastener head 112, daubing lever 220 rotates relative to enclosure 210 (block 356 in FIG. 3). The preceding subject matter of this paragraph characterizes example 19 of the present disclosure, wherein example 19 also includes the subject matter according to example 18, above.

Rotation of daubing lever 220 relative to enclosure 210 allows to retract enclosure 210 away from non-horizontal surface 116 while maintaining contact between working end 22b of daubing lever 220 and fastener head 112. The rotation effectively allows working end 222b to move along axis 202 relative to enclosure 210. It should be noted that this rotation also move working end 222b radially relative to enclosure 210 (e.g., perpendicular to axis 202).

Rotation of daubing lever 220 relative to enclosure 210 may be achieved using a combination of shank 230 of enclosure 210 and through opening 225 of daubing lever 220.

Referring generally to FIG. 1 and particularly to, e.g., FIGS. 3, 2A, 2B, and 6B-6D, according to method 300, as applicator 200 is retracted away from non-horizontal surface 116 along axis perpendicular to non-horizontal surface 116 while maintaining contact between working end 222b of daubing lever 220 and fastener head 112, daubing lever 220 translates relative to enclosure 210 (block 357 in FIG. 3). The preceding subject matter of this paragraph characterizes example 20 of the present disclosure, wherein example 20 also includes the subject matter according to example 19, above.

Translation of daubing lever 220 relative to enclosure 210 allows to retract enclosure 210 away from non-horizontal surface 116 while maintaining contact between working end 222b of daubing lever 220 and fastener head 112. In other words, this translation effectively allows working end 222b to move along axis 202 relative to enclosure 210.

Rotation of daubing lever 220 relative to enclosure 210 may be achieved using a combination of shank 230 of enclosure 210 and through opening 225 of daubing lever 220, which may be a slot. The slot may a straight slot as shown, for example in FIG. 6B. Alternatively, the slot may a curved slot as, for example, shown in FIGS. 6C and 6D. More specifically, a curved slot may include catch as, for example, shown in FIG. 6D.

Figure 4A:
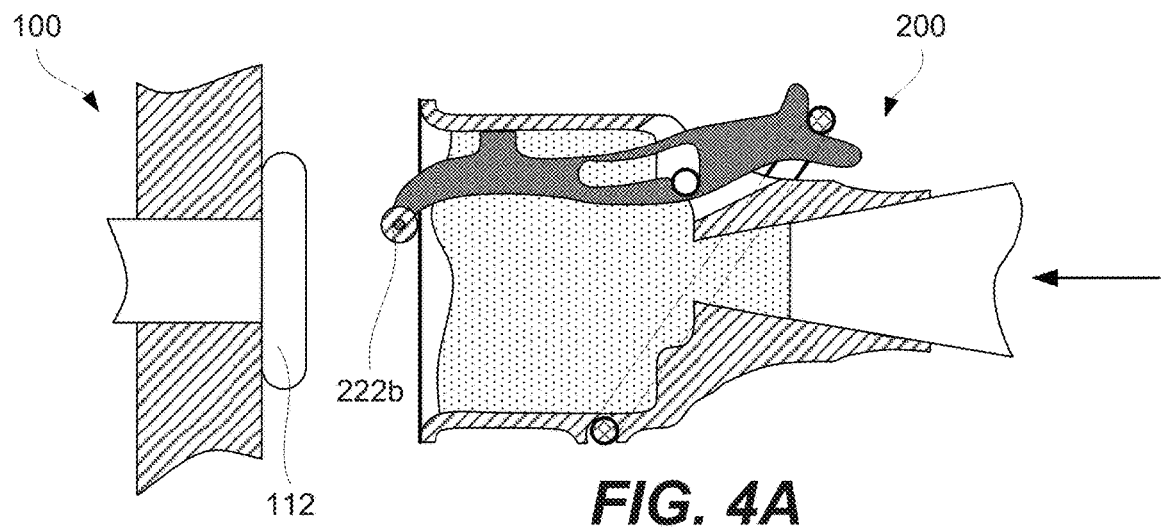
Figure 4B:
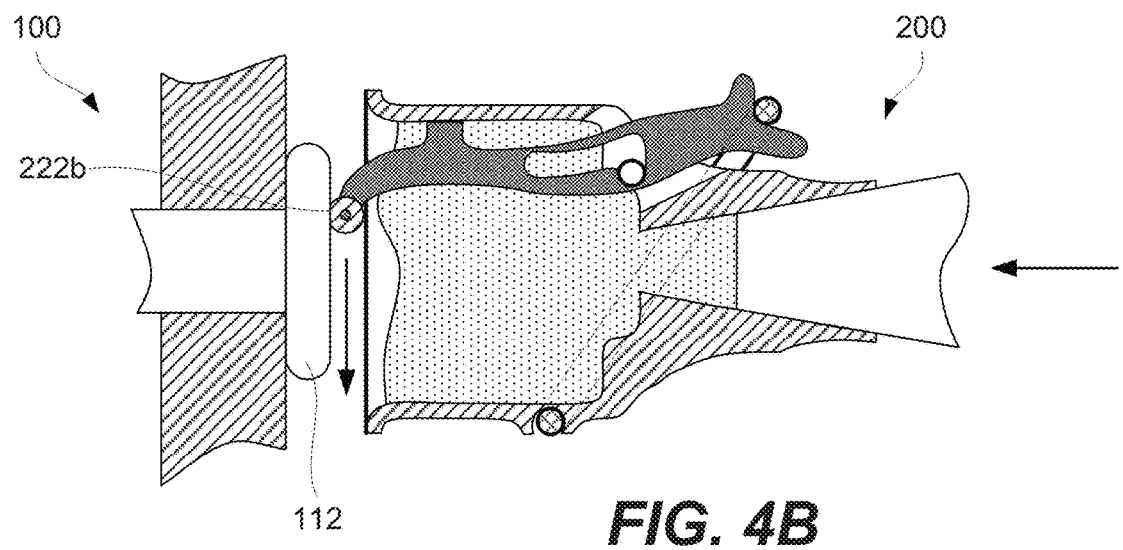
Figure 4C:
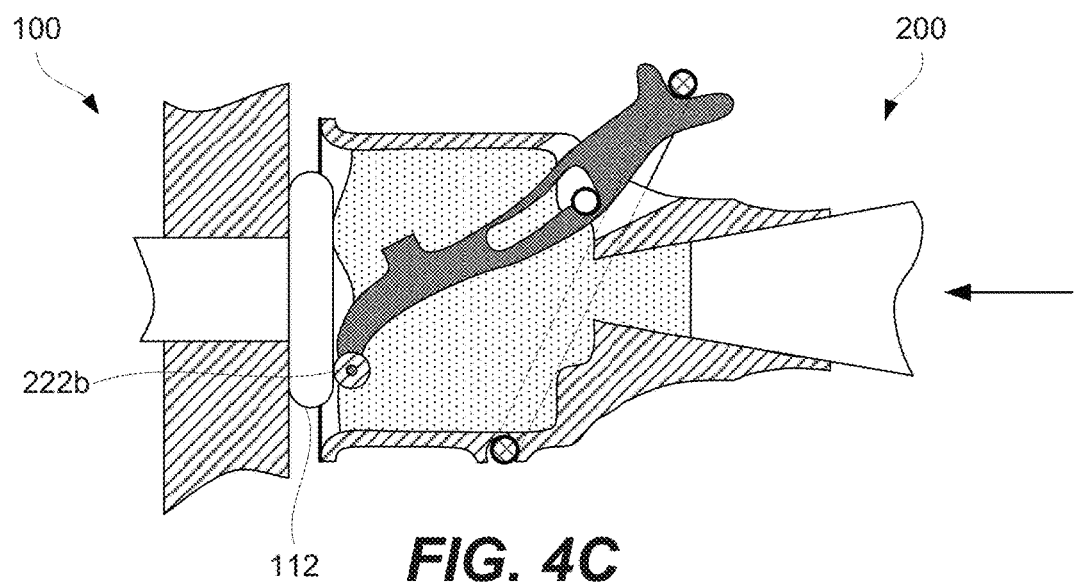
Figure 4D:
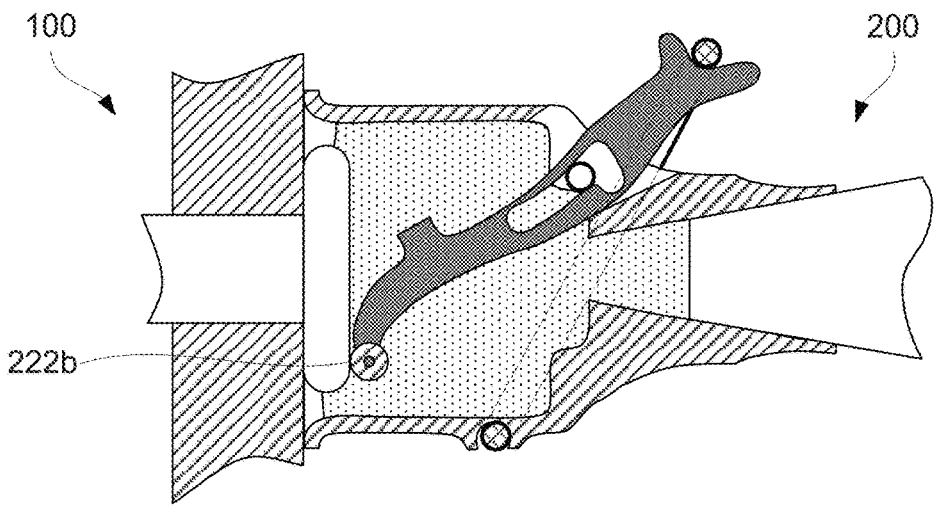
Figure 4E:
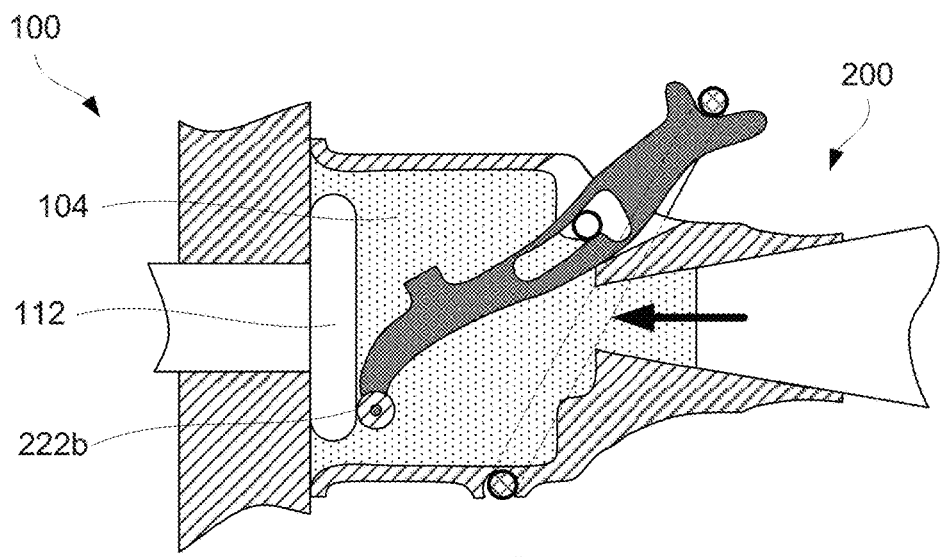

Referring generally to FIG. 1 and particularly to, e.g., FIGS. 3 and 4E, according to method 300, enclosure 210 is at least partially filled with material 104 by injecting material 104 into enclosure 210 through inlet 217 (block 342 in FIG. 3). The preceding subject matter of this paragraph characterizes example 21 of the present disclosure, wherein example 21 also includes the subject matter according to any one of examples 18 to 20, above.

Enclosure 210 is filled with material 104 in order to transfer material 104 onto fastener head 112 and onto non-horizontal surface 116 around fastener head 112. Specifically, when enclosure 210 is in contact with non-horizontal surface 116, material 104 contacts fastener head 112 and non-horizontal surface 116 and remains on fastener head 112 and non-horizontal surface 116 when enclosure 210 is later retracted. Inlet 217 is used to deliver material 104 into enclosure 210.

Inlet 217 may be used to couple enclosure 210 with a material dispenser device, such as a caulking gun, applicator, and the like. Inlet 217 may include dispenser adapter 250 as, for example, shown in FIG. 2A. When material 104 is provide into enclosure 210, material 104 may completely fill enclosure 210 to prevent voids and incomplete sealing of fastener head 112, non-horizontal surface 116, and/or an interface between fastener head 112 and non-horizontal surface 116.

Referring generally to FIG. 1 and particularly to, e.g., FIGS. 3 and 4E-4G, according to method 300, causing working end 222b of daubing lever 220 to move relative to enclosure 210 while retracting applicator 200 away from non-horizontal surface 116 along axis perpendicular to non-horizontal surface 116 comprises flowing material 104 relative to daubing lever 220, extending within interior space 211 of enclosure 210 (block 343 in FIG. 3). The preceding subject matter of this paragraph characterizes example 22 of the present disclosure, wherein example 22 also includes the subject matter according to any one of examples 18 to 21, above.

When daubing lever 220 moves relative to enclosure 210 (and within enclosure 210) and when interior space 211 of enclosure 210 is filled with material 102, daubing lever 220 moves through material 104 within interior space 211 and material 104 flows relative to daubing lever 220. In other words, material 104 flows relative to daubing lever 220.

Daubing lever 220 may include various features, such as tapered portion 229 and material passage 227, to allow material 104 to flow more easily relative to daubing lever 220 and to ensure that the flow of material 104 does not causes uneven distribution of material 140 within enclosure 210.

Referring generally to FIG. 1 and particularly to, e.g., FIGS. 3 and 4E-4G, according to method 300, flowing material 104 relative to daubing lever 220, extending within interior space 211 of enclosure 210, comprises flowing at least portion of material 104 around daubing lever 220 (block 344 in FIG. 3). The preceding subject matter of this paragraph characterizes example 23 of the present disclosure, wherein example 23 also includes the subject matter according to example 22, above.

Material 104 flows around daubing lever 220 while daubing lever 220 moves within interior space 211 of enclosure 210 filled with material 104.

Daubing lever 220 may include various features, such as tapered portion 229 to allow material 104 to flow more easily around daubing lever 220 and to ensure that the flow of material 104 does not causes uneven distribution of material 140 within enclosure 210.

Referring generally to FIG. 1 and particularly to, e.g., FIGS. 3 and 4E-4G, according to method 300, flowing at least portion of material 104 around daubing lever 220, extending within interior space 211 of enclosure 210, comprises flowing at least portion of material 104 around tapered portion 229 of daubing lever 220. The preceding subject matter of this paragraph characterizes example 24 of the present disclosure, wherein example 24 also includes the subject matter according to example 23, above.

Daubing lever 220 may have tapered portion 229, which allows material 104 to more easily flow around daubing lever 220 when daubing lever 220 moves within enclosure 210 filled with material 104. Tapered portion 229 effectively reduces the drag of material 104 onto daubing lever 220.

Tapered portion 229 may include a fillet, chamfer, or any other suitable feature. Tapered portion 229 may be provided on one side of daubing lever 220 or both sides of daubing lever 220.

Referring generally to FIG. 1 and particularly to, e.g., FIGS. 3 and 4E-4G, according to method 300, flowing material 104 relative to daubing lever 220, extending within interior space 211 of enclosure 210, comprises flowing at least portion of material 104 through daubing lever 220 (block 344 in FIG. 3). The preceding subject matter of this paragraph characterizes example 25 of the present disclosure, wherein example 25 also includes the subject matter according to any one of examples 22 to 24, above.

When daubing lever 220 moves within enclosure 210 filled with material 104, daubing lever 220 also moves relative to material 104. Material 104 may flow through daubing lever 220 if, for example, daubing lever 220 comprises material passage 227. Reducing the resistance to this flow (e.g., by allowing material 104 to flow through daubing lever 220) ensures that working end 222b remains in contact with fastener head 112 and allows to increase the speed with which enclosure 210 is being retracted from non-horizontal surface 116.

Material passage 227 may be a ring as, for example, shown in FIG. 5C or any other similar feature. Material passage 227 is designed such that actuation end 222a and working end 222b are supported with respect to each other and allow to transfer the moment through daubing lever 220. The size and shape of material passage 227 may depend on viscosity of material, size of daubing lever 220, size of enclosure 210, and speed with which daubing lever 220 needs to travel through material 104.

Referring generally to FIG. 1 and particularly to, e.g., FIG. 5C, according to method 300, flowing at least portion of material 104 through daubing lever 220 comprises flowing at least portion of material through material passage 227 in daubing lever 220. The preceding subject matter of this paragraph characterizes example 26 of the present disclosure, wherein example 26 also includes the subject matter according to example 25, above.

Daubing lever 220 may have material passage 227 as, for example, shown in FIG. 5C which allows material 104 to flow through daubing lever 220.

Material passage 227 may be a ring as, for example, shown in FIG. 5C or any other similar feature. Material passage 227 is designed such that actuation end 222a and working end 222b are supported with respect to each other and allow to transfer the moment through daubing lever 220. The size and shape of material passage 227 may depend on viscosity of material, size of daubing lever 220, size of enclosure 210, and speed with which daubing lever 220 needs to travel through material 104.

Referring generally to FIG. 1 and particularly to, e.g., FIGS. 3 and 4E-4G, according to method 300, moving working end 222b of daubing lever 220 relative to enclosure 210 across fastener head 112 comprises sliding working end 222b of daubing lever 220 across fastener head 112. The preceding subject matter of this paragraph characterizes example 27 of the present disclosure, wherein example 27 also includes the subject matter according to any one of examples 18 to 26, above.

Sliding working end 222b of daubing lever 220 across fastener head 112 ensures that working end 222b remains in contact with fastener head 112. Specifically, when enclosure 210 is retracted, working end 222b redistributes material 104 on fastener head 112.

Sliding working end 222b of daubing lever 220 across fastener head 112 is enabled by means 240, which impart the moment on daubing lever 220 to cause working end 222b of daubing lever 220 to move relative to enclosure 210 and across fastener head 112. This in turn causes asymmetrical distribution of material 104 such that more material 104 is located along the top half of fastener head 112 then along the bottom half of fastener head 112.

Figure 4F:
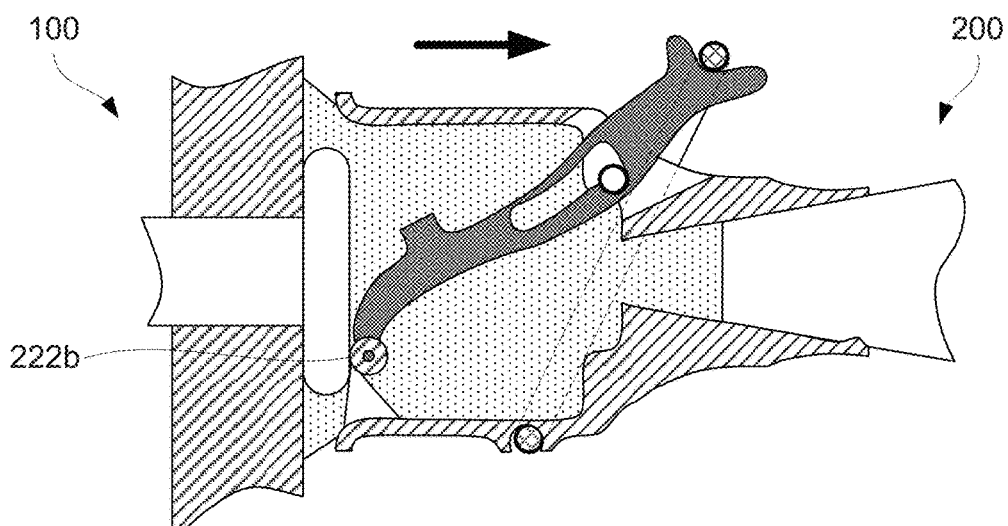
Figure 4G:
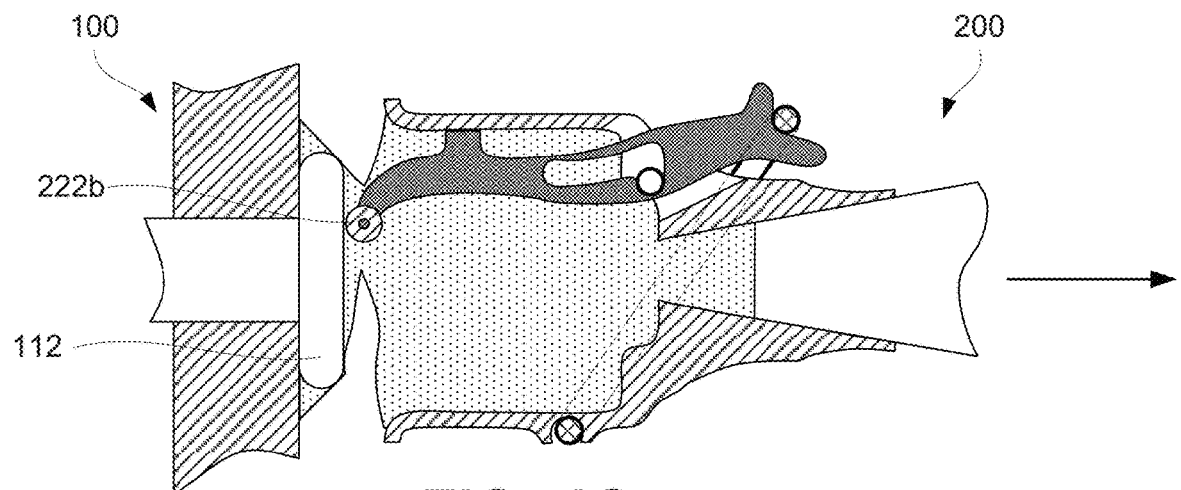

Referring generally to FIGS. 4E-4G and particularly to, e.g., FIG. 5B, according to method 300, moving working end 222b of daubing lever 220 relative to enclosure 210 across fastener head 112 comprises rolling working end 222b of daubing lever 220 across fastener head 112. The preceding subject matter of this paragraph characterizes example 28 of the present disclosure, wherein example 28 also includes the subject matter according to any one of examples 18 to 26, above.

Working end 222b of daubing lever 220 may have roller 223a as, for example, shown in FIG. 5B, which allows working end 222b to roll across fastener head 112, thereby reducing the drag of working end 222b relative to fastener head 112, catching various surface features on fastener head 112 with working end 222b, and reduce potential damage (e.g., scratching to working end 222b and fastener head 112).

FIG. 5B illustrates working end 222b of daubing lever 220 comprising roller 223a. Roller 223a can have a cylindrical shape. It should be noted that both roller 223a and curved paddle 223b are also capable of redistributing material 104 on fastener head 112.

Figure 4H:
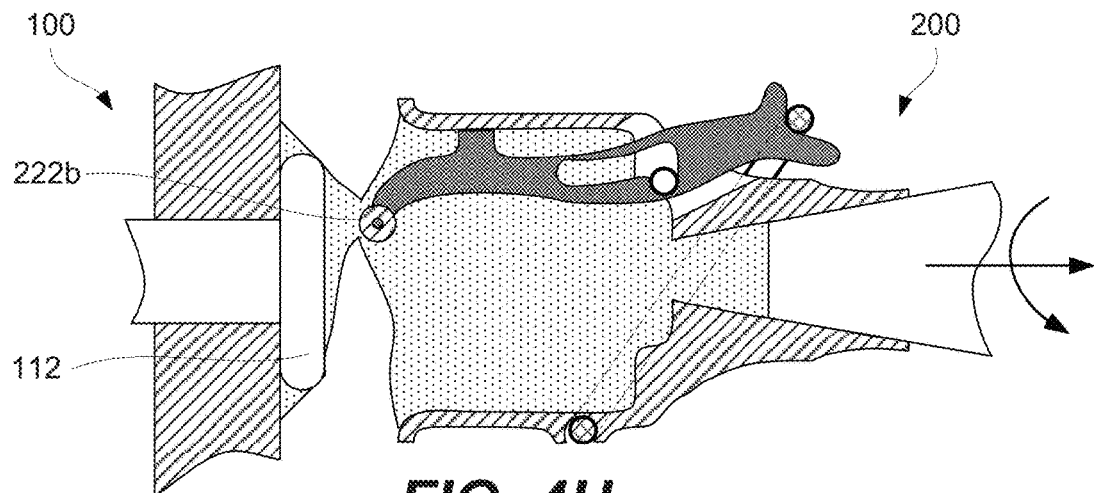

Referring generally to FIG. 3 and particularly to, e.g., FIGS. 4F-4H, method 300 further comprises continuing to retract applicator 200 away from non-horizontal surface 116 along axis perpendicular to non-horizontal surface 116 until contact between working end 222b of daubing lever 220 and fastener head 112 is terminated and abutment portion 228 of daubing lever 220 contacts enclosure 210. The preceding subject matter of this paragraph characterizes example 29 of the present disclosure, wherein example 29 also includes the subject matter according to any one of examples 18 to 28, above.

Once working end 222b completes redistribution of material 104 on fastener head 112 as, for example, schematically shown in FIG. 4G, working end 222b may be retracted from fastener head 112. At this point, abutment portion 228 of daubing lever 220 contacts enclosure 210 such daubing lever 220 cannot further move relative to enclosure under the force from means 240.

Figure 4I:
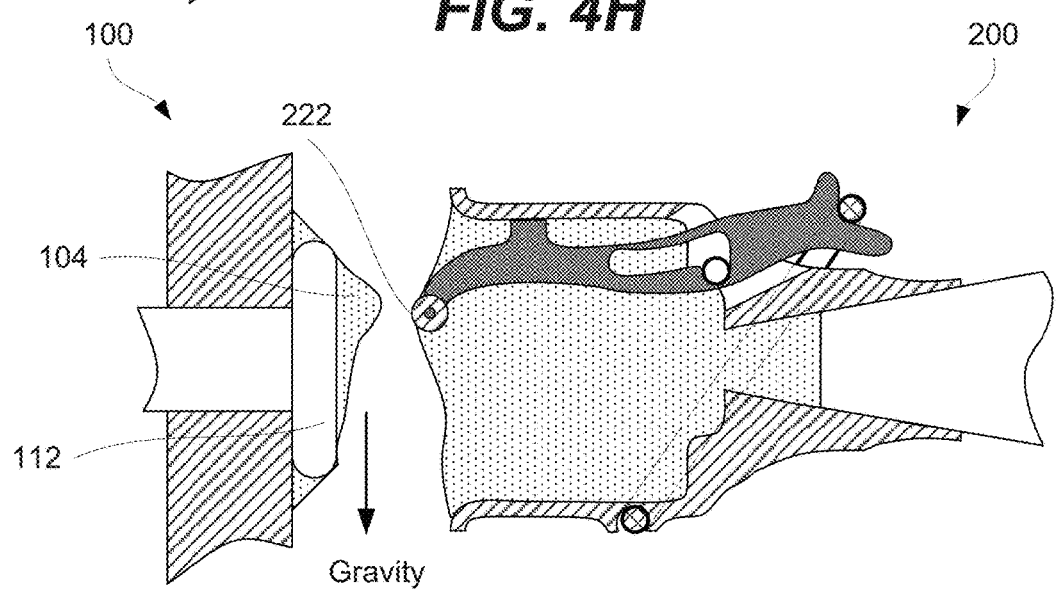
Figure 4J:
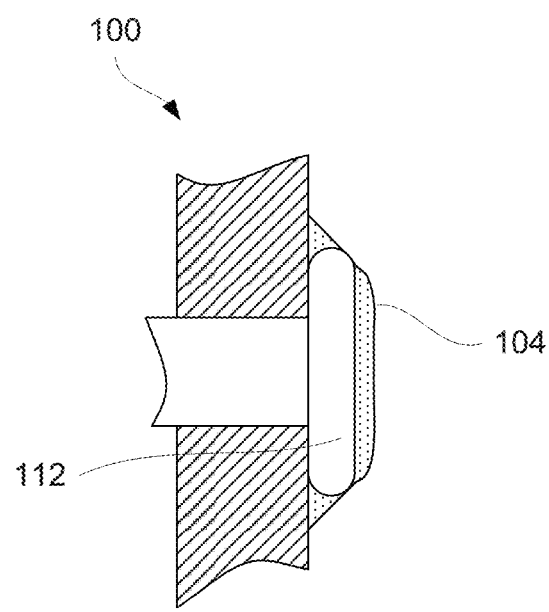

Referring generally to FIG. 1 and particularly to, e.g., FIGS. 4I-4J, method 300 further comprises using gravity to symmetrically redistribute across fastener head 112 material 104 that was asymmetrically distributed across fastener head 112 by working end 222b of daubing lever 220. The preceding subject matter of this paragraph characterizes example 30 of the present disclosure, wherein example 30 also includes the subject matter according to example 29, above.

After working end 222b completes redistribution of material 104 on fastener head 112 and working end 222b is retracted away from fastener head 112, material 104 is not supported by working end 222b and the gravitation force may redistribute material 104 across fastener head 112. This gravitation redistribution of material 104 may even out material 104 on fastener head 112.

Examples of the present disclosure may be described in the context of aircraft manufacturing and service method 1100 as shown in FIG. 7 and aircraft 1102 as shown in FIG. 8. During pre-production, illustrative method 1100 may include specification and design (block 1104) of aircraft 1102 and material procurement (block 1106). During production, component and subassembly manufacturing (block 1108) and system integration (block 1110) of aircraft 1102 may take place. Thereafter, aircraft 1102 may go through certification and delivery (block 1112) to be placed in service (block 1114). While in service, aircraft 1102 may be scheduled for routine maintenance and service (block 1116). Routine maintenance and service may include modification, reconfiguration, refurbishment, etc. of one or more systems of aircraft 1102.

Each of the processes of illustrative method 1100 may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

As shown in FIG. 8, aircraft 1102 produced by illustrative method 1100 may include airframe 1118 with a plurality of high-level systems 1120 and interior 1122. Examples of high-level systems 1120 include one or more of propulsion system 1124, electrical system 1126, hydraulic system 1128, and environmental system 1130. Any number of other systems may be included. Although an aerospace example is shown, the principles disclosed herein may be applied to other industries, such as the automotive industry. Accordingly, in addition to aircraft 1102, the principles disclosed herein may apply to other vehicles, e.g., land vehicles, marine vehicles, space vehicles, etc.

Apparatus(es) and method(s) shown or described herein may be employed during any one or more of the stages of the manufacturing and service method 1100. For example, components or subassemblies corresponding to component and subassembly manufacturing (block 1108) may be fabricated or manufactured in a manner similar to components or subassemblies produced while aircraft 1102 is in service (block 1114). Also, one or more examples of the apparatus(es), method(s), or combination thereof may be utilized during production stages 1108 and 1110, for example, by substantially expediting assembly of or reducing the cost of aircraft 1102. Similarly, one or more examples of the apparatus or method realizations, or a combination thereof, may be utilized, for example and without limitation, while aircraft 1102 is in service (block 1114) and/or during maintenance and service (block 1116).

Different examples of the apparatus(es) and method(s) disclosed herein include a variety of components, features, and functionalities. It should be understood that the various examples of the apparatus(es) and method(s) disclosed herein may include any of the components, features, and functionalities of any of the other examples of the apparatus(es) and method(s) disclosed herein in any combination, and all of such possibilities are intended to be within the scope of the present disclosure.

Many modifications of examples set forth herein will come to mind to one skilled in the art to which the present disclosure pertains having the benefit of the teachings presented in the foregoing descriptions and the associated drawings.

Therefore, it is to be understood that the present disclosure is not to be limited to the specific examples illustrated and that modifications and other examples are intended to be included within the scope of the appended claims. Moreover, although the foregoing description and the associated drawings describe examples of the present disclosure in the context of certain illustrative combinations of elements and/or functions, it should be appreciated that different combinations of elements and/or functions may be provided by alternative implementations without departing from the scope of the appended claims. Accordingly, parenthetical reference numerals in the appended claims are presented for illustrative purposes only and are not intended to limit the scope of the claimed subject matter to the specific examples provided in the present disclosure.

What is claimed is:

1. An applicator for applying a material over a fastener head, protruding from a non-horizontal surface of a part, the applicator comprising:
   an enclosure, comprising:
      a wall, comprising:
         an inner side;
         an interior surface on the inner side; and
         an outer side, opposite the inner side; and
      an interior space, defined by the interior surface of the wall;
   a daubing lever that passes through the wall of the enclosure and that is movably coupled to the enclosure, and wherein the daubing lever comprises:
      an actuation end, located on the outer side of the wall of the enclosure;
      a working end, located opposite the actuation end on the inner side of the wall of the enclosure; and
      an abutment portion, located at one of the actuation end, the working end, or between the actuation end and the working end; and
   a biasing element, configured to impart a moment on the daubing lever to bias the abutment portion of the daubing lever toward the enclosure.

2. The applicator according to claim 1, wherein the enclosure comprises a sealing rim that lies in a virtual plane.

3. The applicator according to claim 2, wherein the sealing rim of the enclosure has a circular shape.

4. The applicator according to claim 1, wherein the daubing lever is rotatable relative to the enclosure.

5. The applicator according to claim 4, wherein:
   the daubing lever comprises a through opening, and
   the applicator further comprises a shank, fixed to the enclosure and protruding through the through opening of the daubing lever.

6. The applicator according to claim 5, wherein the through opening of the daubing lever is circular.

7. The applicator according to claim 5, wherein the through opening of the daubing lever is a curved slot.

8. The applicator according to claim 5, wherein the through opening of the daubing lever is a straight slot.

9. The applicator according to claim 5, wherein the through opening of the daubing lever has a dogleg shape.

10. The applicator according to claim 5, wherein:
    the daubing lever further comprises a material passage, located between the actuation end and the working end of the daubing lever.

11. The applicator according to claim 10, wherein:
    a line, perpendicular to a plane, containing a smallest circumferentially closed section of the through opening, lies in a first plane;
    a line, perpendicular to a plane, containing a smallest circumferentially closed section of the material passage, lies in a second plane; and
    the first plane is perpendicular to the second plane.

12. The applicator according to claim 4, wherein the daubing lever is translatable relative to the enclosure.

13. The applicator according to claim 1, wherein:
    the daubing lever further comprises a tapered portion between the actuation end and the working end of the daubing lever.

14. The applicator according to claim 13, wherein:
    a line, perpendicular to a plane, containing a smallest circumferentially closed section of the through opening, lies in a first plane; and
    a symmetry plane of the tapered portion is perpendicular to the first plane.

15. The applicator according to claim 1, wherein the daubing lever is movable relative to the enclosure such that the abutment portion of the daubing lever is capable of contacting the interior surface of the enclosure.

16. The applicator according to claim 1, wherein the working end of the daubing lever comprises one of a roller or a curved paddle.

17. The applicator according to claim 1, wherein the working end of the daubing lever is operable to extend outside of the interior space of the enclosure.

18. The applicator according to claim 1, wherein the biasing element is a rubber band, a spring, or a pneumatic device.

19. The applicator according to claim 1, wherein the biasing element is a rubber band, circumscribing the enclosure and the actuation end of the daubing lever.

20. The applicator according to claim 1, further comprising an inlet, fluidically connected to the enclosure.

* * * * *